United States Patent
Wright et al.

(10) Patent No.: US 7,352,268 B2
(45) Date of Patent: Apr. 1, 2008

(54) HIGH INTENSITY RADIAL FIELD MAGNETIC ACTUATOR

(75) Inventors: Andrew M. Wright, Cambridge, MA (US); David Cope, Medfield, MA (US)

(73) Assignee: Engineering Matters, Inc., Newton, MA (US)

( * ) Notice: Subject to any disclaimer, the term of this patent is extended or adjusted under 35 U.S.C. 154(b) by 348 days.

(21) Appl. No.: 11/097,747

(22) Filed: Apr. 1, 2005

(65) Prior Publication Data

US 2005/0168311 A1   Aug. 4, 2005

(51) Int. Cl.
H01F 7/00 (2006.01)
H01F 7/08 (2006.01)

(52) U.S. Cl. .................. 335/229; 335/234; 335/306

(58) Field of Classification Search ........ 335/229–234, 335/306
See application file for complete search history.

(56) References Cited

U.S. PATENT DOCUMENTS

| 5,097,161 | A  | 3/1992  | Nashiki et al. ............... 310/12 |
| 5,847,480 | A  | 12/1998 | Post .......................... 310/90.5 |
| 6,259,174 | B1 | 7/2001  | Ono ............................ 310/13 |
| 6,304,320 | B1 | 10/2001 | Tanaka et al. ................ 355/73 |
| 6,316,849 | B1 | 11/2001 | Konkola et al. .............. 310/12 |
| 6,355,994 | B1 | 3/2002  | Andeen et al. ............... 310/15 |
| 6,408,045 | B1 | 6/2002  | Matsui et al. ................ 378/34 |
| 6,512,571 | B2 | 1/2003  | Hara ........................... 355/53 |
| 6,590,355 | B1 | 7/2003  | Kikuchi et al. ............. 318/135 |
| 2001/0017490 | A1 | 8/2001 | Suzuki et al. ................ 310/12 |
| 2002/0190582 | A1 | 12/2002 | Denne ........................ 310/14 |
| 2003/0030779 | A1 | 2/2003 | Hara ........................... 355/53 |
| 2003/0052548 | A1 | 3/2003 | Hol et al. .................... 310/12 |

FOREIGN PATENT DOCUMENTS

JP   2003209963 A  *  7/2003

OTHER PUBLICATIONS

Image from PowerPoint Presentation, Corcoran Engineering, Apr. 2001, re: (Linear) Halbach Array Magnet Configuration.

* cited by examiner

*Primary Examiner*—Ramon M. Barrera
(74) *Attorney, Agent, or Firm*—Hayes Soloway PC

(57) ABSTRACT

At least one set of two magnets is provided, at least one of the magnets having an outer magnet portion, a middle magnet portion, and an inner magnet portion. The outer magnet portion has a magnetization pointing in an at least partially axial direction. The middle magnet portion has a magnetization substantially perpendicular to the magnetization of the outer magnet portion. The inner magnet portion has a magnetization directed substantially anti-parallel to the magnetization of the outer magnet portion. The apparatus also includes at least one electrically conductive coil positioned at least partially between the set of two magnets. At least one substantially magnetically permeable object is positioned at least partially between the set of two magnets. A rod is integral with the substantially magnetically permeable object.

27 Claims, 23 Drawing Sheets

HIGH INTENSITY RADIAL FIELD MAGNETIC ACTUATOR

CROSS-REFERENCES

The present application claims benefit of pending U.S. patent application Ser. No. 10/899,794, filed on Jul. 27, 2004, titled, "High Intensity Radial Field Magnetic Array and Actuator", the disclosure of which is incorporated herein by reference.

FIELD OF THE INVENTION

The present invention is related to the field of magnetism, and in particular, is related to direct drive actuators employing a radial magnetic field and conducting coil acting on an element of a valve.

BACKGROUND OF THE INVENTION

Actuators are traditionally a mechanical art. Most actuators contain valves, springs, and pivoting elements that move the valves. One of the problems with mechanical actuators is that parts of the mechanical actuators have a tendency to wear down. When the springs become less elastic and the pivoting joints become worn, the valves cease to operate in an efficient manner. An actuator with fewer moving parts would tend to outlast the traditional mechanical actuators.

Recently, a need has developed for actuators that are extremely small. For instance, through rapid advancement in the miniaturization of essential elements such as inertial measurement units, sensors, and power supplies, Micro Air Vehicles (MAVs) have been developed. These MAVs are being designed to be as small as 15 centimeters. Mechanical actuators at such a small size are extremely unwieldy and unreliable.

Thus, a heretofore unaddressed need exists in the industry to address the aforementioned deficiencies and inadequacies.

SUMMARY OF THE INVENTION

Embodiments of the present invention provide a system and method for providing a magnetic actuator.

Briefly described, in architecture, one embodiment of the system, among others, can be implemented as follows. The magnetic actuator system provides at least one set of two magnets, at least one of the magnets having an outer magnet portion, a middle magnet portion, and an inner magnet portion. The outer magnet portion has a magnetization pointing in an at least partially axial direction. The middle magnet portion has a magnetization substantially perpendicular to the magnetization of the outer magnet portion. The inner magnet portion has a magnetization directed substantially anti-parallel to the magnetization of the outer magnet portion. The apparatus also includes at least one electrically conductive coil positioned at least partially between the two magnets. At least one substantially magnetically permeable object is positioned at least partially between the two magnets. A rod is integral with the substantially magnetically permeable object and extends therefrom.

The present invention can also be viewed as providing methods for magnetically moving an actuator. In this regard, one embodiment of such a method, among others, can be broadly summarized by the following steps: proximately assembling at least one set of two magnets, at least one of the magnets comprising: an outer magnet portion having a magnetization pointing in an at least partially axial direction; a middle magnet portion having a magnetization substantially perpendicular to the magnetization of the outer magnet portion; and an inner magnet portion having a magnetization directed substantially anti-parallel to the magnetization of the outer magnet portion; positioning at least one substantially magnetically permeable object at least partially between the set of two magnets; positioning at least one electrically conductive coil at least partially between the set of two magnets; and initiating a current in a first direction within the conductive coil, which magnetically forces the substantially magnetically permeable object toward a first magnet of the set of two magnets.

Other systems, methods, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
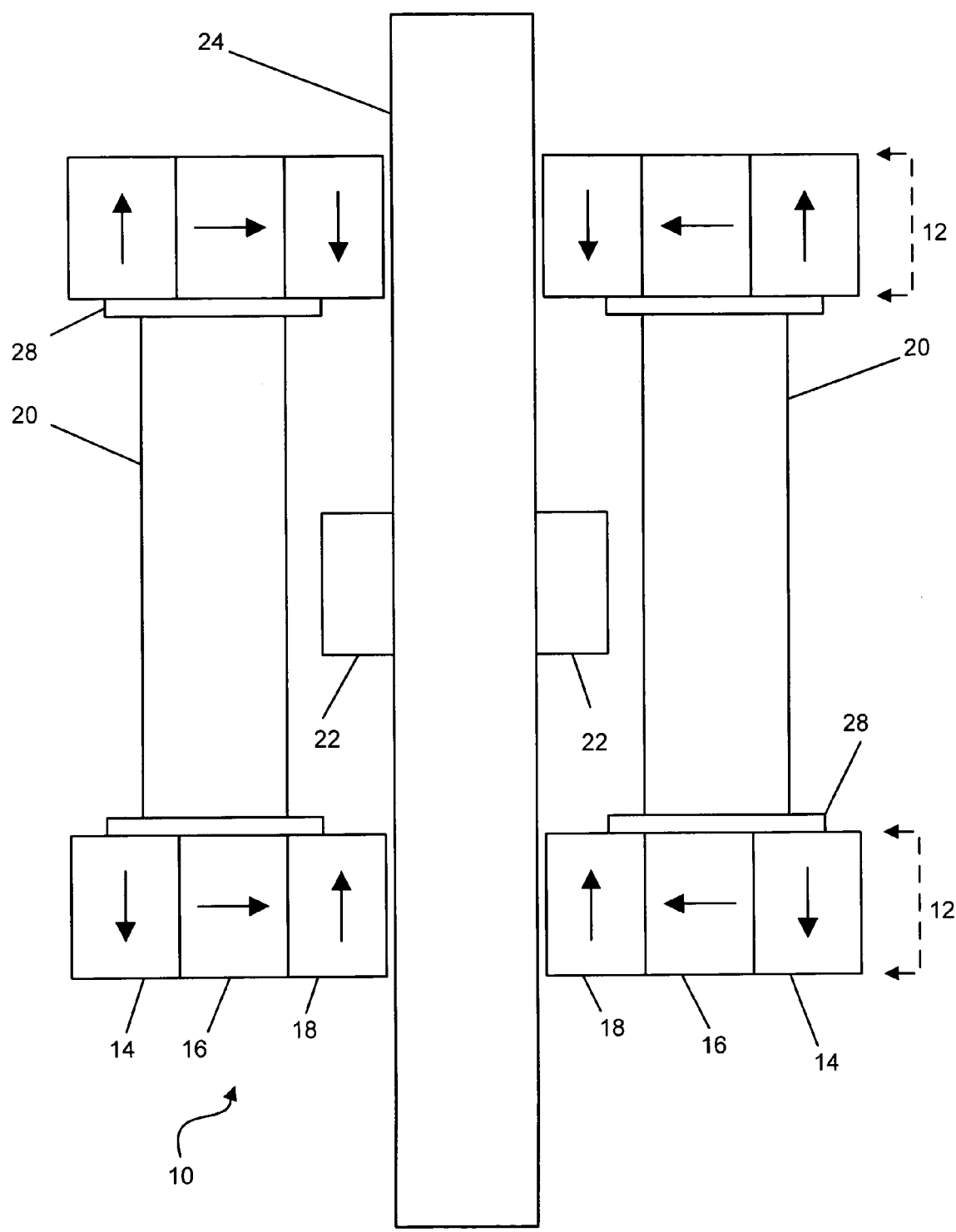
FIG. 1 is a cross-sectional view of the magnetic actuator in accordance with a first exemplary embodiment of the invention.
Figure 2:
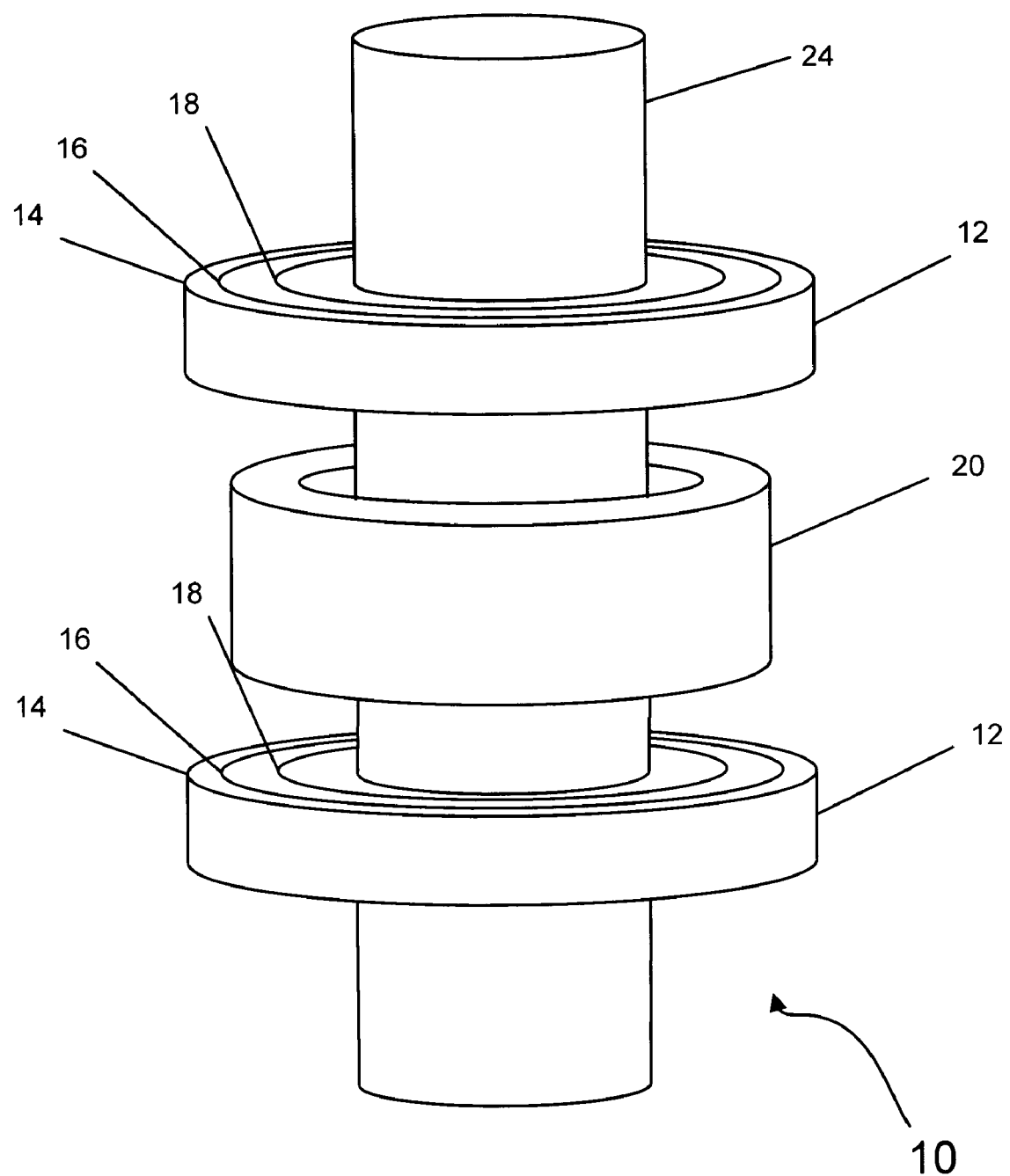
FIG. 2 is a perspective view of the magnetic actuator of FIG. 1, in accordance with the first exemplary embodiment of the invention.

FIG. 1 is a cross-sectional view and FIG. 2 is a perspective view of a first exemplary embodiment of the magnetic actuator 10. At least one set of two nested magnet arrays 12 is provided, each nested magnetic array 12 having an outer magnet 14, a middle magnet 16, and an inner magnet 18. The magnetization of the three magnets 14, 16, 18 is illustrated by arrows shown within the magnets 14, 16, 18. The outer magnet 14 has a magnetization pointing in an at least partially axial direction. The middle magnet 16 has a magnetization substantially perpendicular to the magnetization of the outer magnet 14. The inner magnet 18 has a magnetization directed substantially anti-parallel to the magnetization of the outer magnet 14. Comparing the magnetization of the magnets 14, 16, 18 in the two nested magnet arrays 12, the magnetizations of the two outer magnets 14 are anti-parallel, the magnetizations of the two middle magnets 16 are parallel, and the magnetizations of the two inner magnets 18 are anti-parallel. The magnetic actuator 10 also includes at least one electrically conductive coil 20 positioned at least partially between the two nested magnet arrays 12. At least one substantially magnetically permeable object 22 is positioned at least partially between the two nested magnet arrays 12. A rod 24 is integral with the substantially magnetically permeable object 22. The rod 24 may be permanently or releasably connected to the substantially magnetically permeable object 22 or the rod 24 and the substantially magnetically permeable object 22 may be a one-piece unit. In this embodiment, the rod 24 extends axially within each of the two nested magnet arrays 12 and the electrically conductive coil 20. Specifically, the magnetic arrays 12 provide an opening within which the rod 24 is located. Therefore, the rod 24 is capable of vertically shifting through the magnetic arrays 12.

Referring back to FIG. 1, copper sheet 28 may be attached to one of the magnetic arrays 12, separating the magnetic array 12 from the conductive coil 20. One of the functions of the copper sheet 28 may be to act as a heat sink, dissipating heat from the conductive coil 20. The copper sheet 28 may contain radial separations to avoid operating as a conductor for the current in the conductive coil 20 and thereby altering the dynamics of the magnetic fields.

As can be seen from FIG. 2, the nested magnet arrays 12 of the present invention are designed to be single-piece, cylindrical magnets 14, 16, 18. However, other geometric three-dimensional shapes, including those with square, hexagonal, or octagonal cross-sections can be used. Similarly, while single-piece magnets 14, 16, 18 are envisioned, the nested magnet arrays 12 can be comprised of a plurality of magnet pieces that together form a cylindrical or other acceptable three-dimensional shape. Those having ordinary skill in the art will recognize a vast number of permutations exist for the acceptable shape of the nested magnet arrays 12.

Figure 3:
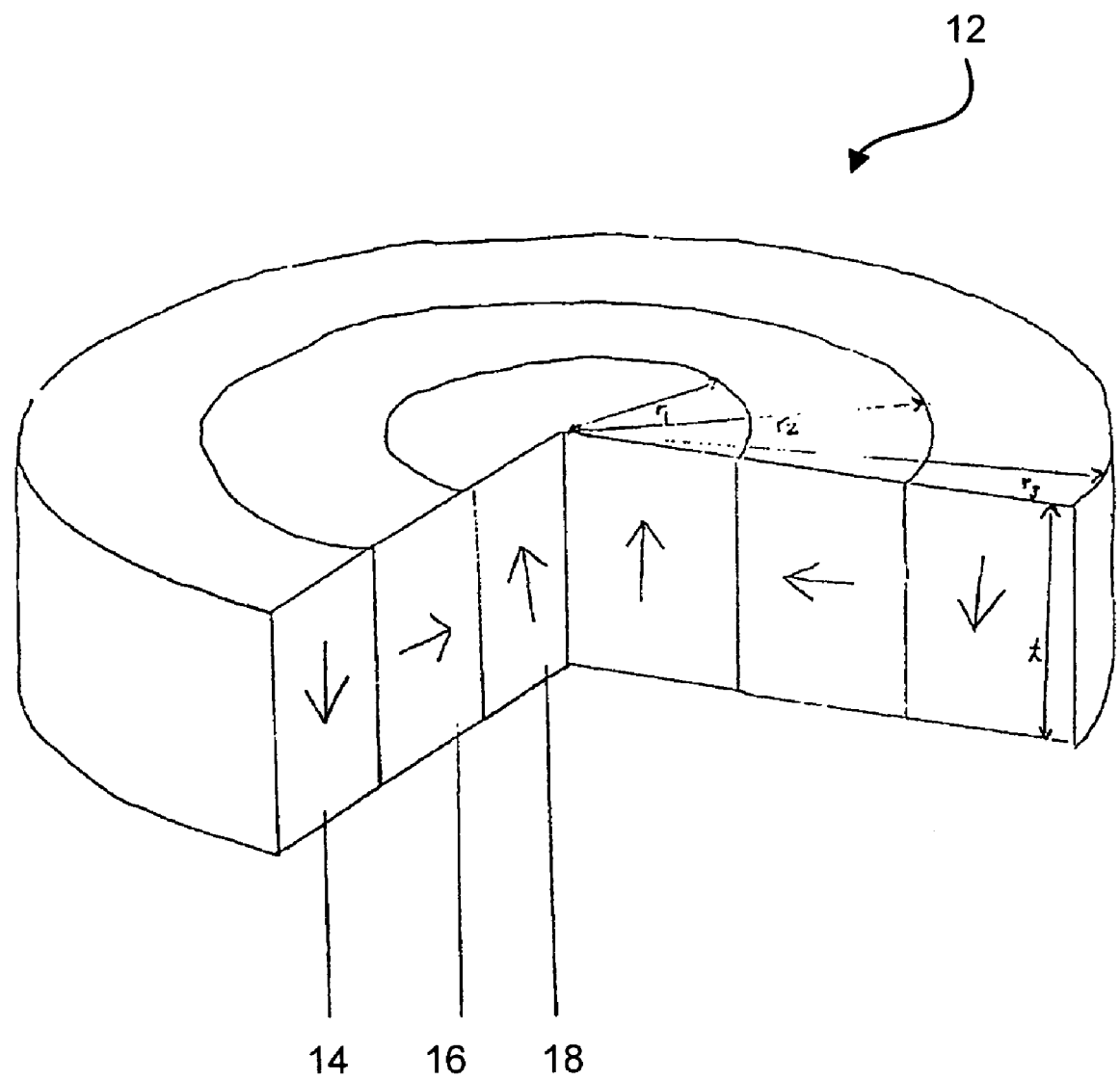
FIG. 3 is a partial cutaway schematic view of an exemplary high intensity radial field (HIRF) permanent magnet array, in accordance with the first exemplary embodiment of the invention.

FIG. 3 is a schematic view of one the nested magnet arrays 12 consistent with the present invention. It should be noted that the magnetic array 12 of FIG. 3 is shown as a solid cylindrical member, while the magnetic arrays 12 shown in FIG. 1 require an annular inner magnet 18. This illustration is merely for exemplary purposes. In some embodiments, such as that in FIG. 1, it is understood that the inner magnet 18 is annular for allowing the rod 24 to reside therein and vertically shift within the magnetic array 12.

The nested magnetic array 12 comprises two nested annular magnets 14, 16 and an inner cylindrical magnet 18, which could also be annular, which are magnetized in the orientations shown in FIG. 3 or in their opposite orientations, respectively. The outer magnet 14 has a magnetization pointing axially out of the bottom of the array; the magnetization of the middle magnet 16 is perpendicular to the magnetization of the outer magnet 14 and points in the inward radial direction; and the magnetization of the inner magnet 18 points anti-parallel to the outer magnet 14, i.e., out of the top of the array. Inner and outer magnets 14, 18 are anti-parallel to each other and may be magnetized in the opposite directions, and the middle magnet 16 may be magnetized in either radial direction, in both cases, depending on the side axially where the magnetic field is to be intensified.

Figure 4:
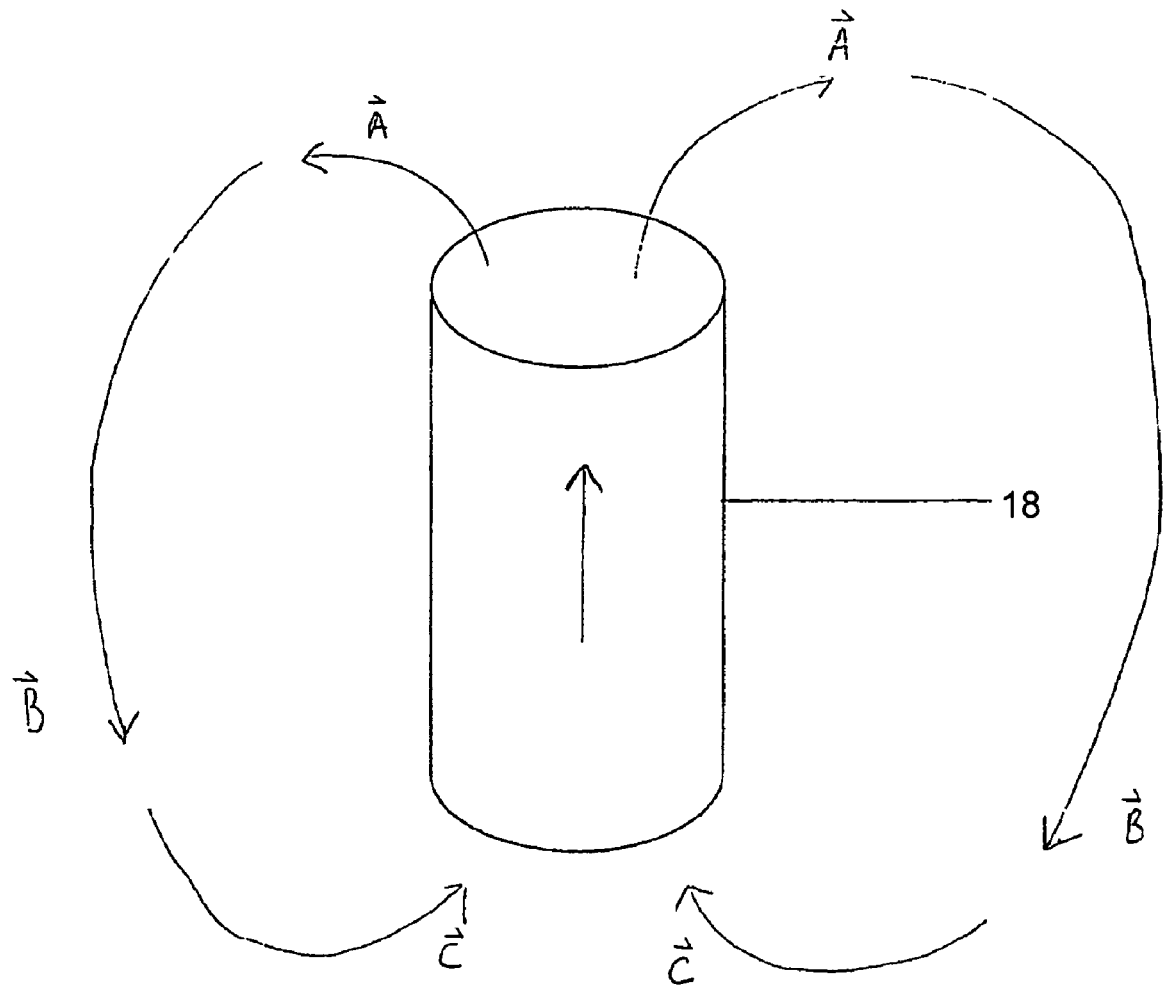
FIG. 4 is a perspective view of the inner magnet, illustrating magnetic field lines created by magnetization of the inner magnet, in accordance with the first exemplary embodiment of the invention.
Figure 5:
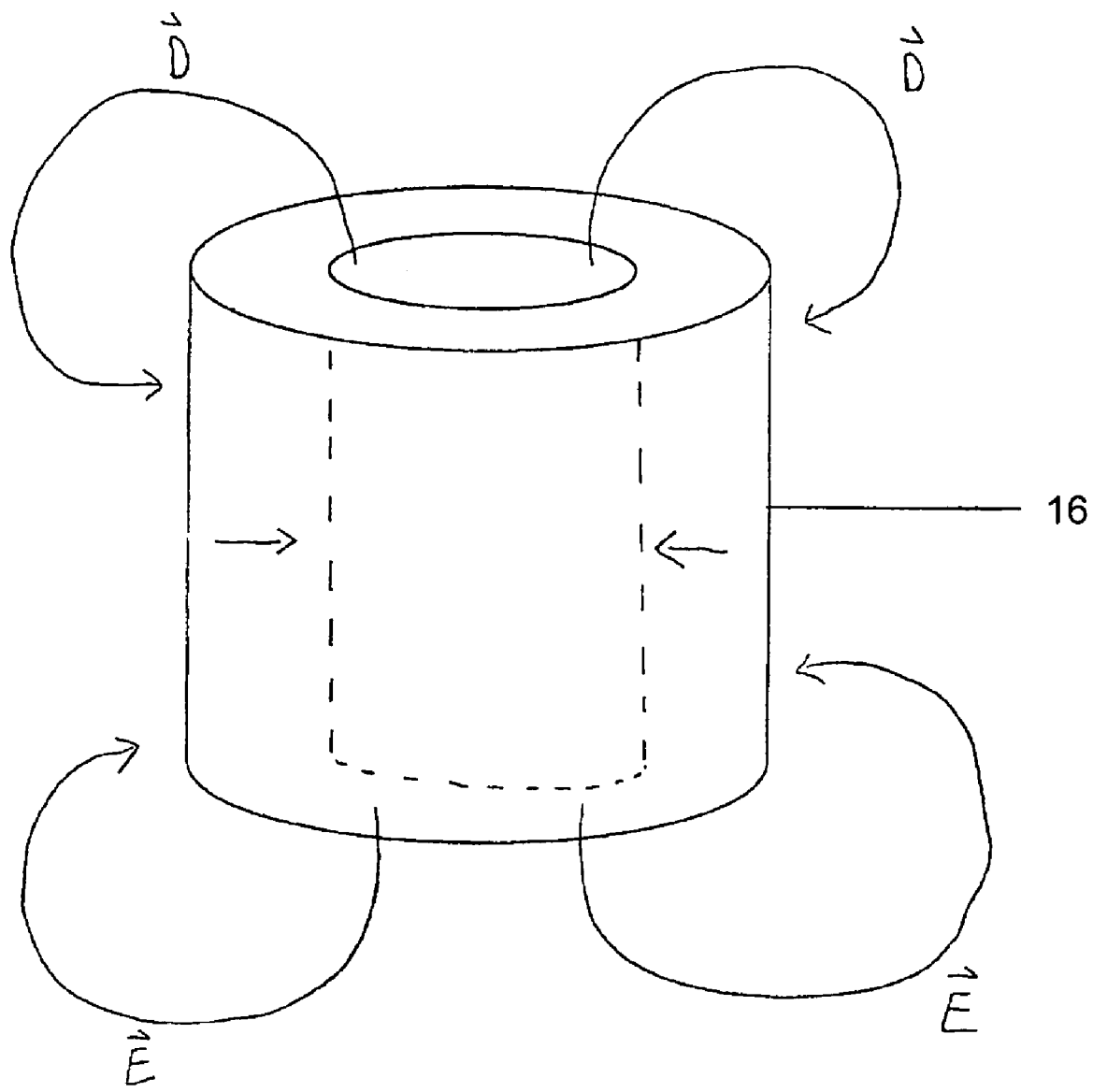
FIG. 5 is a perspective view of the middle magnet, illustrating magnetic field lines created by magnetization of the middle magnet, in accordance with the first exemplary embodiment of the invention.
Figure 6:
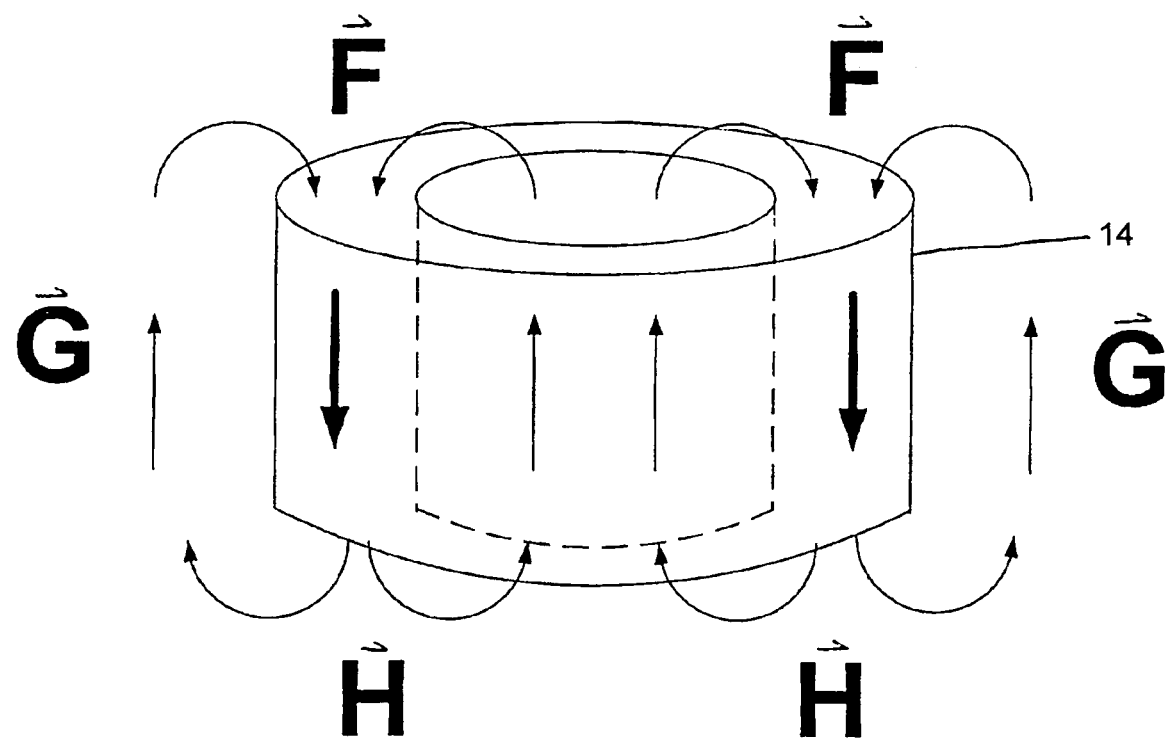
FIG. 6 is a perspective view of the outer magnet, illustrating magnetic field lines created by magnetization of the outer magnet, in accordance with the first exemplary embodiment of the invention.

The magnetic fields created by each of the three nested magnets 14, 16, 18 in the nested magnetic array 12 are shown in FIGS. 4-6.

FIG. 4 shows the direction of the magnetic field lines created by the inner magnet 18. The magnetic field for the inner magnet 18 points vertically upward inside the inner magnet 18 and curls around to the outside of the inner magnet 18 from the top to the bottom as represented by vectors A, B, and C.

FIG. 5 shows the magnetic field of the middle magnet 16. The magnetization points radially inward inside the middle magnet 16. Vectors D and E represent the direction of the magnetic field outside the middle magnet 16.

The magnetic field of the outer magnet 14 is illustrated in FIG. 6. The magnetization of the outer magnet 14 is vertically downward. The direction of the magnetic field is represented in FIG. 6 by vectors F, G and H.

Figure 7:
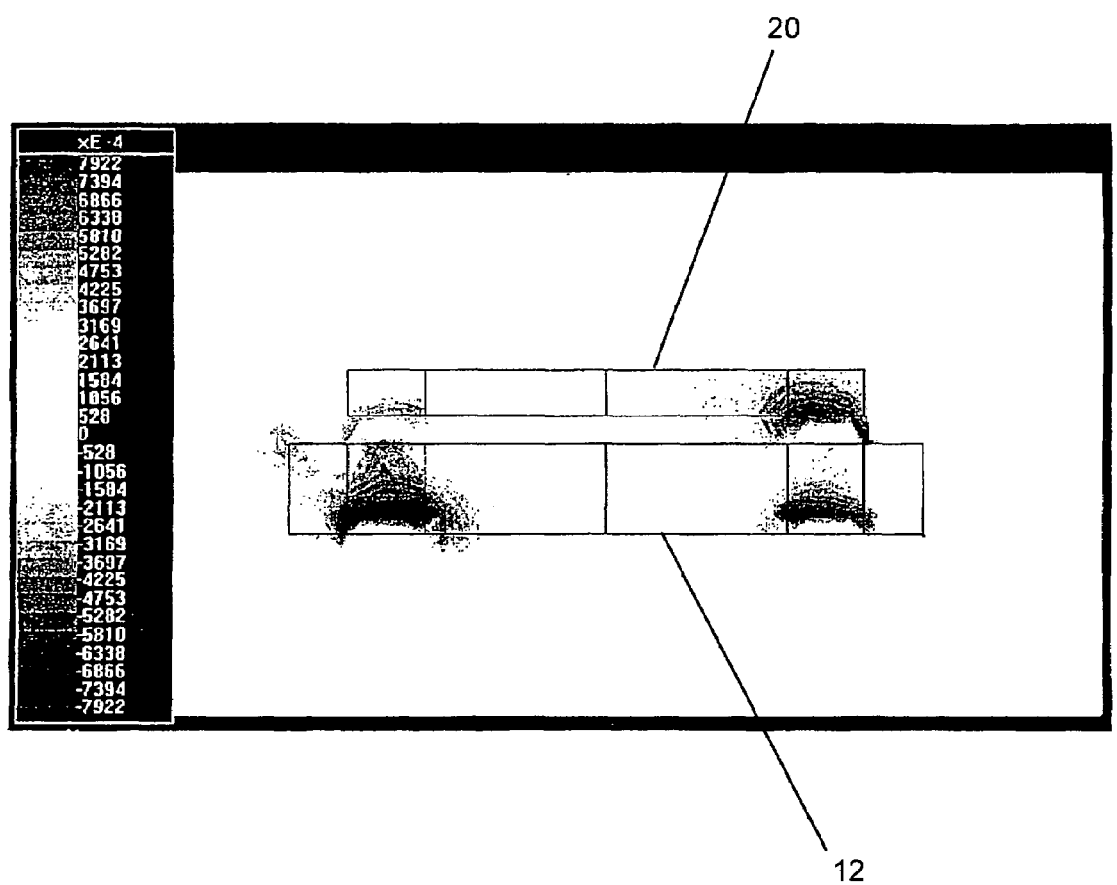
FIG. 7 is a plot illustrating the radial/horizontal magnetic field intensity from the permanent magnetic array of FIG. 1, in accordance with the first exemplary embodiment of the invention.
Figure 8:
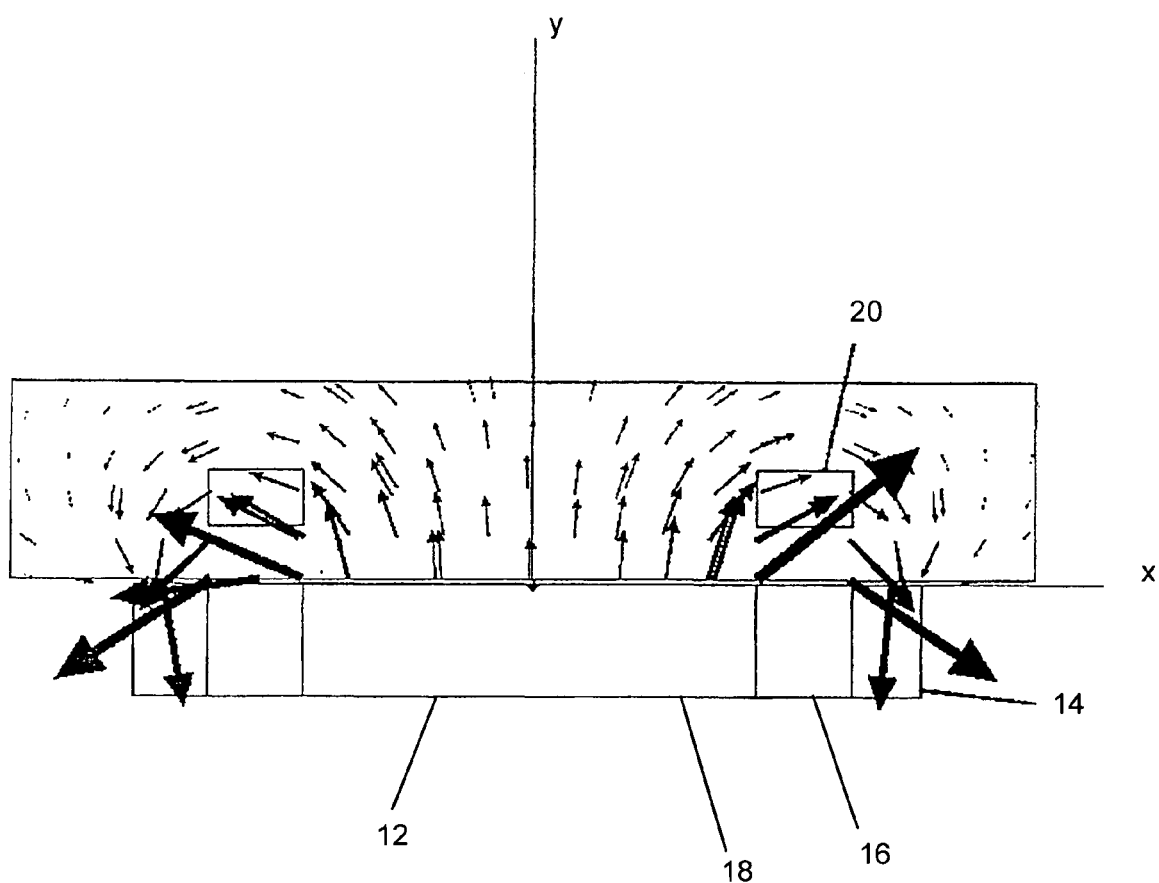
FIG. 8 is an arrow plot illustrating the radial magnetic field orientation above one magnetic array and intersecting a conductive coil, in accordance with the first exemplary embodiment of the invention.

Superposing the fields of the three magnets 14, 16, 18 in FIGS. 4-6 will produce the magnetic field of the magnetic array 12 shown in FIGS. 7 and 8. Referring to FIGS. 4-6, vectors A, D and F represent the fields of the three magnets 14, 16, 18 above the magnetic array 12, respectively. These three vectors are all pointing in the same direction above middle magnet 16, and therefore, the magnetic fields add together to create a high intensity magnetic field pointing radially outward. Vectors B and G represent the magnetic field along the side of the magnetic array 12. These two vectors are pointing in opposite directions and thus partially cancel one another. Finally, vectors C, E, and H represent the field of each magnet 14, 16, 18 below the magnetic array 12. The field E of the middle magnet 16 points in the opposite direction from the fields C and H of the two other magnets 14, 18. Therefore, there is a partial cancellation of the magnetic field in this area. Consequently, a very weak magnetic field exists below the magnetic array 12.

The vectorial addition of fields increases the radial field above the magnetic array 12, while decreasing the radial field below the magnetic array 12. By reversing the magnetization of the middle magnet 16, the high magnetic field can be shifted from above to below the magnetic array 12. Alternatively, the magnetization vectors of both the inner and outer magnets 14, 18 could be reversed to control the location of the large radial magnetic field.

A specific advantage of this magnet configuration is the shifting of magnetic field from unused space away from the conductor to where a conducting coil 20 is situated. This results in an efficient usage of the total magnetic field from the nested magnets 14, 16, 18. FIG. 7 shows the intensity of the radial (horizontal) component of the magnetic field. It should be noted that the magnetic field is strong where a conducting coil 20 is above the magnetic array 12, while comparatively non-existent below the magnetic array 12.

Another important aspect of the magnet array 12 is that the field extends radially above the magnets 14, 16, 18. FIG. 8 illustrates an arrow plot of the magnetic field orientation above the magnetic array 12, in the conductive coil 20 region. It should be noted that the magnitude of magnetic fields is represented by differently sized arrows, where larger sized arrows represent larger magnitudes of magnetic fields. In this exemplary embodiment of one magnetic array 12 of the present invention, the magnetic field curls from the inner magnetic field through the conductive coil 20 into the outer magnet 14. If the first magnetic field curls outward from the inner magnet 18 to the outer magnet 14, then the second magnetic field should also point radially outward, i.e., the middle magnet 16 magnetization is radially inward and its magnetic field outside the middle magnet 16 is outward.

Those having ordinary skill in the art will recognize that, although the foregoing embodiment describes a High Intensity Radial Field ("HIRF") actuator with reference to a magnetic array 12 below the conductive coil 20, the magnetic array 12 could, alternatively, be located on either side of or above the conductive coil 20.

The magnets 14, 16, 18 described herein may comprise rare earth magnets, e.g., NdFeB or SmCo. Since magnetic field superposition is a consideration, ceramic and AlNiCo magnets may be less desirable for some applications, as they do not have substantially linear responses, e.g., as compared to NdFeB. However, since ceramic magnets are linear over a portion of their operating curve, they may have potential utility in certain non-critical embodiments of the invention, e.g. actuators for toys.

Exemplary dimensions of a magnetic array 12, e.g., as shown in FIG. 3 used with the present invention may be as follows: the inner magnet 18 having a radius $r_1=2$ mm and a height of 1 mm; the middle magnet 16 having an inner radius=$r_1$, an outer radius $r_2=r_1+0.83$ mm, and a height of 1 mm; and the outer magnet 14 having an inner radius=$r_2$, an outer radius $r_3=r_2+0.63$ mm, and a height of 1 mm. Here, the conductive coil 20 dimensions may be: inner radius=$r_1$, outer radius=$r_1+0.83$ mm, and a height t=0.5 mm. It should be noted that the flux area of the three magnets 14, 16, 18 is desirably constant (although not necessary), and the flux areas may be described by the following equations:

$$A1 = .\text{pi.}*r_1^2 \text{(top)} \qquad (\text{Eq.1})$$

$$A2 = 2*.\text{pi.}*r_1*t \text{(side)} \qquad (\text{Eq.2})$$

$$A3 = .\text{pi.}*(r_3^2 - r_2^2)\text{(top)} \qquad (\text{Eq.3})$$

$$\text{where } A1 = A2 = A3. \qquad (\text{Eq.4})$$

Further, the (vertical) gap between opposing magnetic arrays 12 is Z=1.6 mm and the ampere-turns of the conductive coil 20 are NI=100 ampere-turns.

It should be understood that the aforementioned geometry and dimensions are merely exemplary, and it is contemplated that the present invention covers other embodiments of arrays, actuators, and actuation systems not specifically illustrated or described herein, having alternative geometries. For example, while the conductive coil 20 dimensioned as described above may produce a high level of heat, and therefore may be suitable for an aerodynamic application, e.g., high forced convection or a duty cycle of 10% or less, it should be recognized that alternative coil sizes may be selected based on factors such as desired thrust (force) and heating.

Those skilled in the art will recognize that the inner magnet 18 of an array consistent with the present invention may be either an annular or cannulated member, i.e., hollow, or alternatively, a solid cylindrical member (which would affect the configuration of the rod). A magnetic array 12 consistent with the invention having an inner magnet 18 that has an aperture, or hole, along its central axis may or may not be fixed to another component as is part of an actuation system.

The magnetic actuator 10 may be arranged such that a distance between the nested magnet arrays 12 is equivalent to between about twice a radius of the outer magnets 14 of the nested magnet arrays 12 and six times the radius of the outer magnets 14 of the nested magnet arrays 12. More preferably, the magnetic actuator 10 may be arranged such that the distance between the nested magnet arrays 12 is approximately four times the radius of the outer magnets 14 of the nested magnet arrays 12.

Figure 9A:
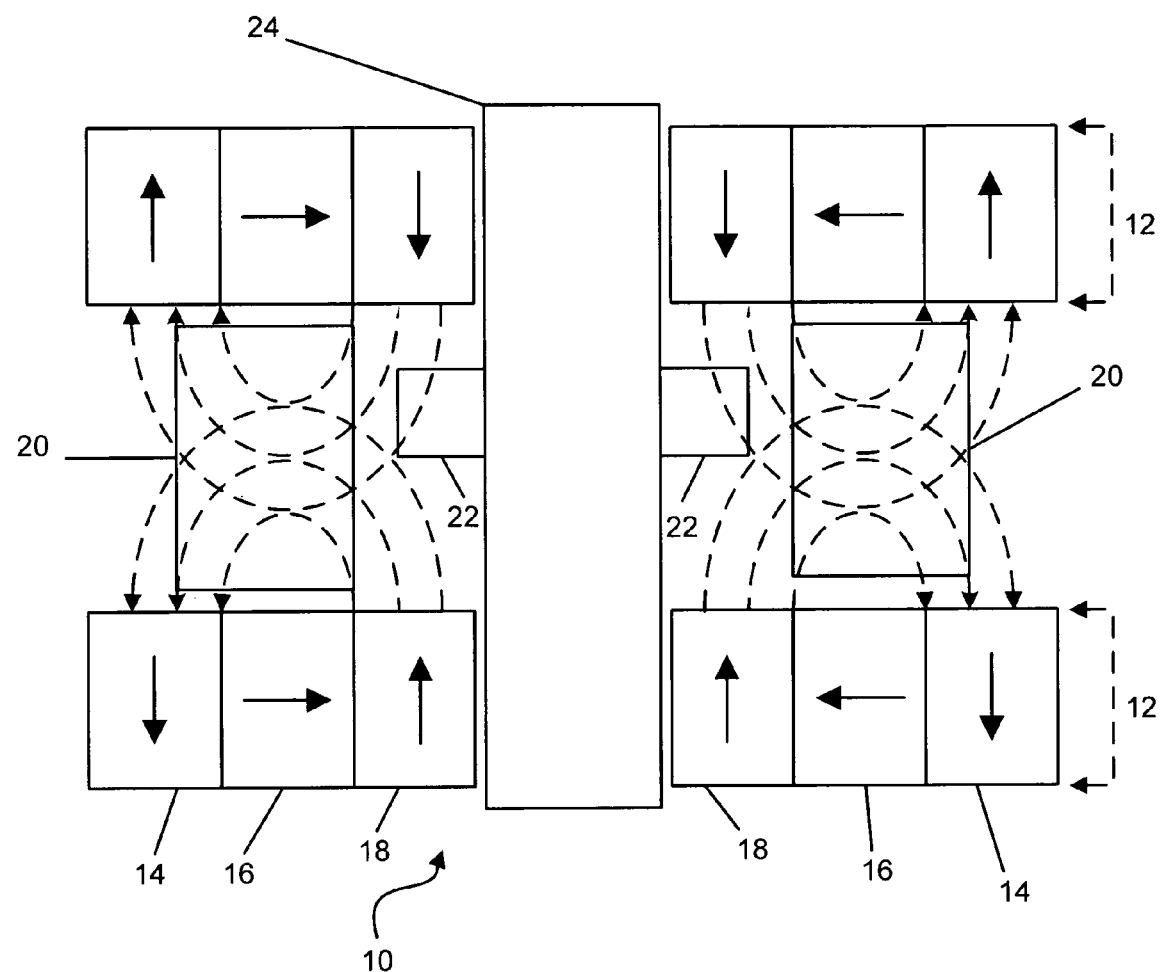
FIG. 9A and FIG. 9B are cross-sectional views of the magnetic actuator of FIG. 1 illustrating the radial magnetic field orientation, in accordance with the first exemplary embodiment of the invention.

FIG. 9A shows the effect of the magnetization of each of the magnets 14, 16, 18 on the conductive coil 20 and the substantially magnetically permeable object 22. FIG. 9A shows the magnetic actuator 10 without current traveling through the conductive coil 20. As shown, one nested magnetic array 12 is on top of the conductive coil 20 and the substantially magnetically permeable object 22 and another nested magnetic array 12 is shown at the bottom. The top nested magnetic array 12 is magnetically inverted with respect to the nested magnetic array 12 on the bottom. That is, the top nested magnetic array 12 is positioned so that the direction of the magnetic field in the top inner magnet 18 is anti-parallel to the magnetic field in the bottom inner magnet 18 and the direction of the magnetic field in the top outer magnet 14 is anti-parallel to the magnetic field in the bottom outer magnet 14. As a result, the axial forces of the top nested magnetic array 12 and the bottom nested magnetic array 12 substantially cancel each other out, while the radial force of the nested magnet arrays 12 is combined and, thereby, magnified. Neither the conductive coil 20, nor the substantially magnetically permeable object 22 is affected as neither item can be moved radially.

Figure 9B:
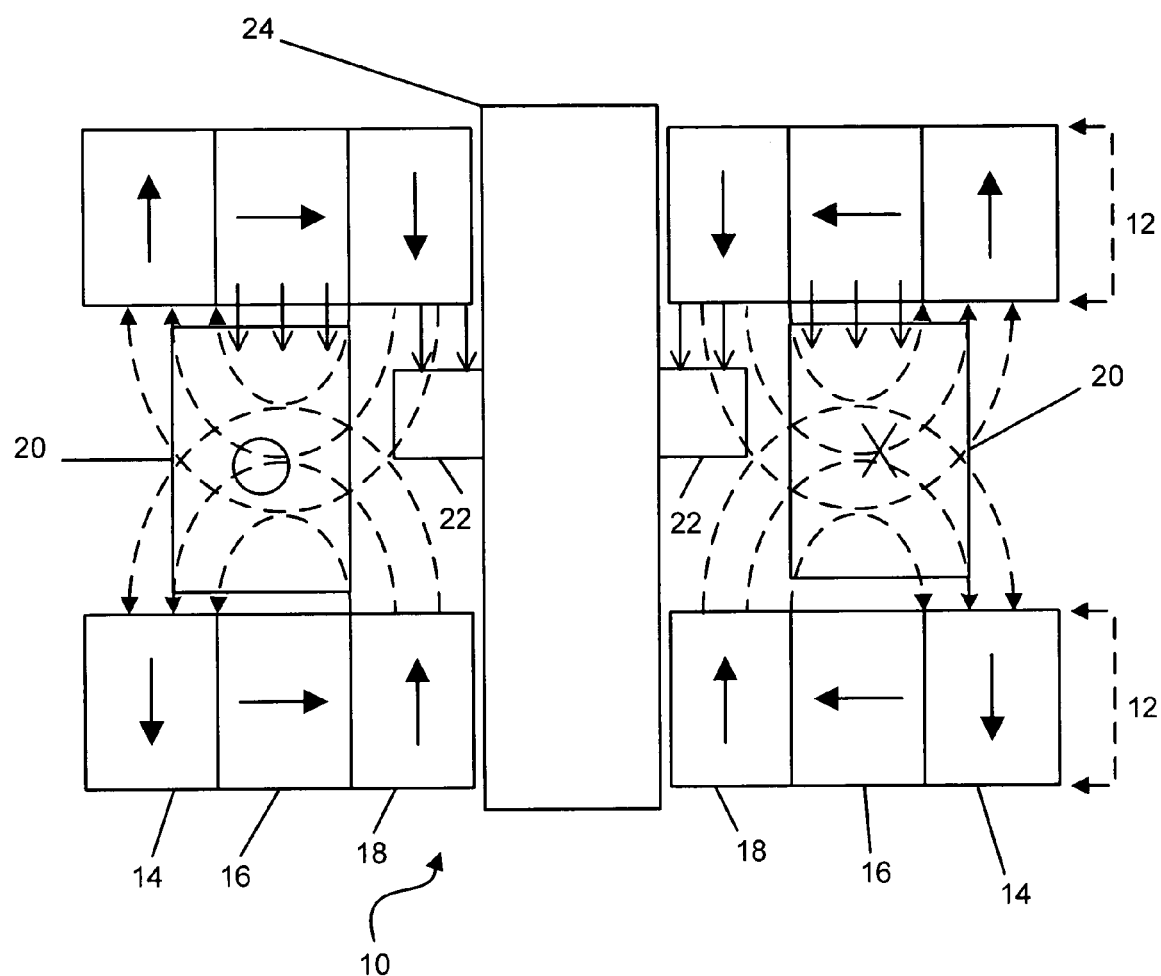

FIG. 9B shows the same arrangement as FIG. 9A with the addition of current being conducted through the conductive coil 20. As shown, the current is traveling out of the page at the section of conductive coil 20 marked with a circle and into the page at the section of conductive coil 20 marked with an "X". As a result of the current in the conductive coil 20, an additional magnetic force is provided, which results in a downward force, in this example, on both the conductive coil 20 and the substantially magnetically permeable object 22. As the conductive coil 20 is provided with substantially no space to move axially, the conductive coil 20 is substantially unmoved by the applied force. However, the substantially magnetically permeable object 22 is moved downward, as is the rod 24 to which the substantially magnetically permeable object 22 is integrally attached.

One of the fields of application envisioned for the present invention is the automotive field. The magnetic actuator 10 can be used to provide a fully electronically-controlled intake/exhaust valve actuating system. Simply providing current to the conductive coil 20 can actuate a valve connected to the rod 24. A fully electronically-controlled inlet/exhaust valve actuating system eliminates camshafts completely, thus (1) eliminating the packaging restrictions placed upon an engine by conventional camshaft profiling, and (2) allowing optimization of the gas exchange process across the whole engine speed and load range. Electromagnetic actuation of intake and exhaust valves in an engine affords greater control over the emissions, overall efficiency, and performance of the vehicle.

Figure 10:
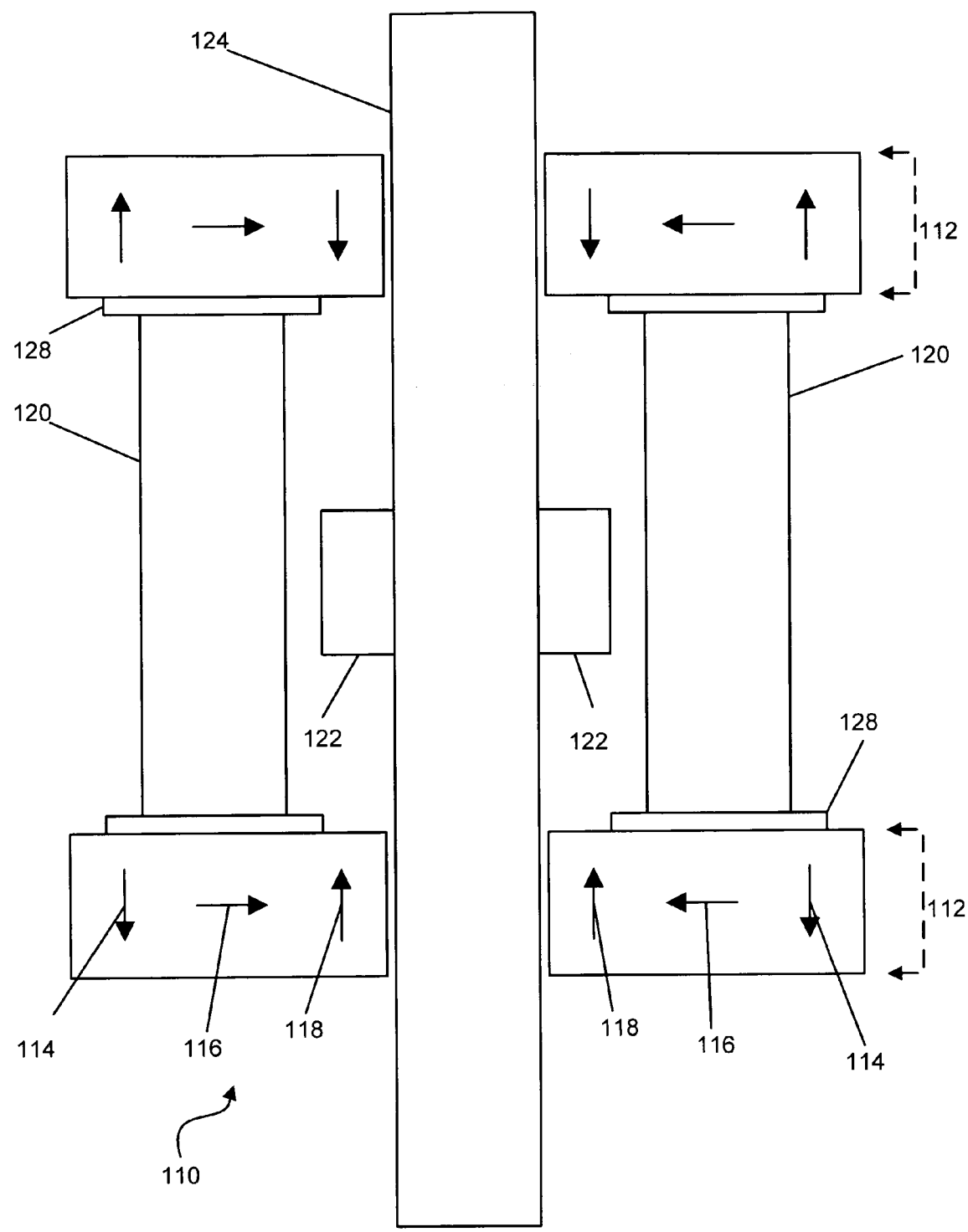
FIG. 10 is a cross-sectional view of the magnetic actuator, in accordance with a second exemplary embodiment of the invention.
Figure 11:
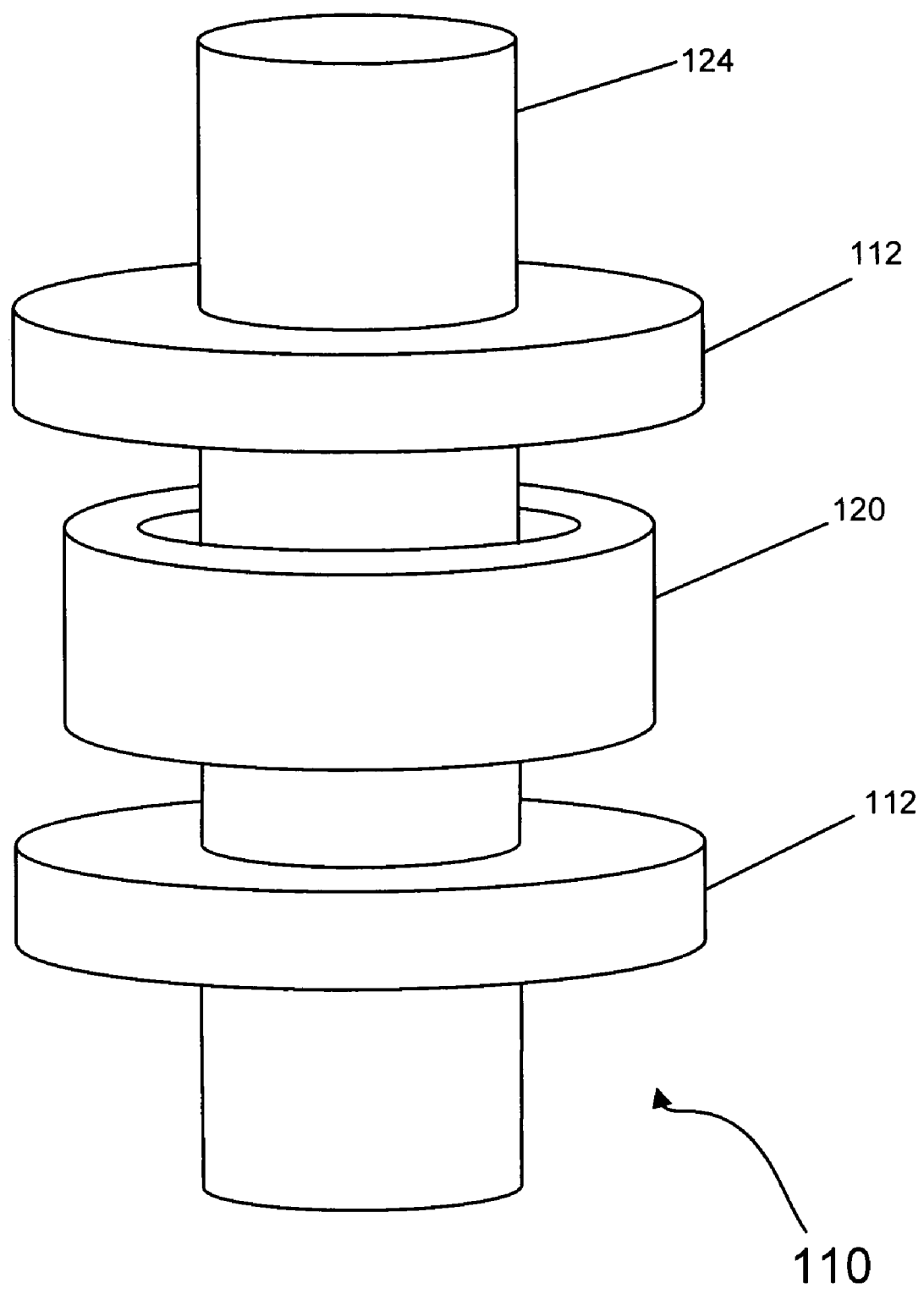
FIG. 11 is a perspective view of the magnetic actuator of FIG. 10, in accordance with the second exemplary embodiment of the invention.

FIG. 10 is a cross-sectional view and FIG. 11 is a perspective view of a set of magnetic actuator 110, in accordance with a second exemplary embodiment of the invention. At least one set of two magnets 112 is provided, each magnet 112 having an outer magnet portion 114, a middle magnet portion 116, and an inner magnet portion 118. Arrows shown within the magnet portions 114, 116, 118, illustrate the magnetization of the three magnet portions 114, 116, 118. The outer magnet portion 114 has a magnetization pointing in an at least partially axial direction. The middle magnet portion 116 has a magnetization substantially perpendicular to the magnetization of the outer magnet portion 114. The inner magnet portion 118 has a magnetization directed substantially anti-parallel to the magnetization of the outer magnet portion 114. Comparing the magnetization of the magnet portions 114, 116, 118 in the two magnets 112, the magnetizations of the two outer magnet portions 114 are anti-parallel, the magnetizations of the two middle magnet portions 116 are parallel, and the magnetizations of the two inner magnet portions 118 are anti-parallel. The set of magnetic actuator 110 also includes at least one electrically conductive coil 120 positioned at least partially between the two magnets 112. At least one substantially magnetically permeable object 122 is positioned at least partially between the two magnets 112. A rod 124 is integral with the substantially magnetically permeable object 122. The rod 124 may be permanently or releasably connected to the substantially magnetically permeable object 122 or the rod 124 and the substantially magnetically permeable object 122 may be a one-piece unit. In this embodiment, the rod 124 extends axially within each of the two magnets 112 and the electrically conductive coil 120. Specifically, the magnets 112 provide an opening within which the rod 124 is located. Therefore, the rod 124 is capable of vertically shifting through the magnets 112.

As can be seen from FIG. 11, the magnet 112 of the present invention is designed to be a single-piece, cylindrical magnet. However, other geometric three-dimensional shapes, including those with square, hexagonal, or octagonal cross-sections can be used. Similarly, while single-piece magnets 112 are envisioned in this exemplary embodiment, the magnets 112 can be comprised of a plurality of magnet pieces that together form a cylindrical or other acceptable three-dimensional shape. Those having ordinary skill in the art will recognize a vast number of permutations exist for the acceptable shape of the magnets 112 and the pieces thereof.

Figure 12A:
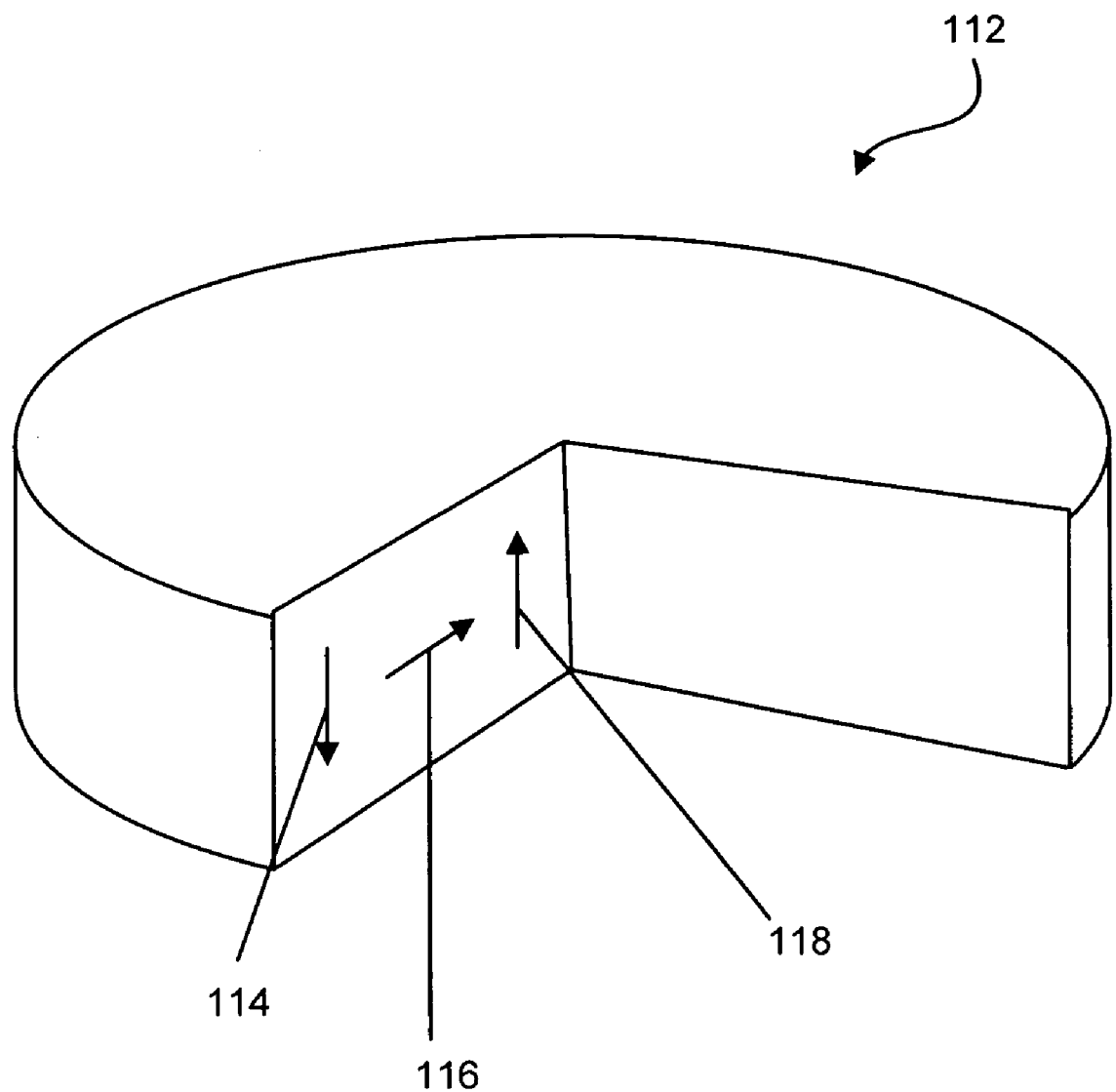
FIG. 12A is a partial cutaway schematic view of an exemplary high intensity radial field (HIRF) permanent magnet, in accordance with the second exemplary embodiment of the invention.
Figure 12B:
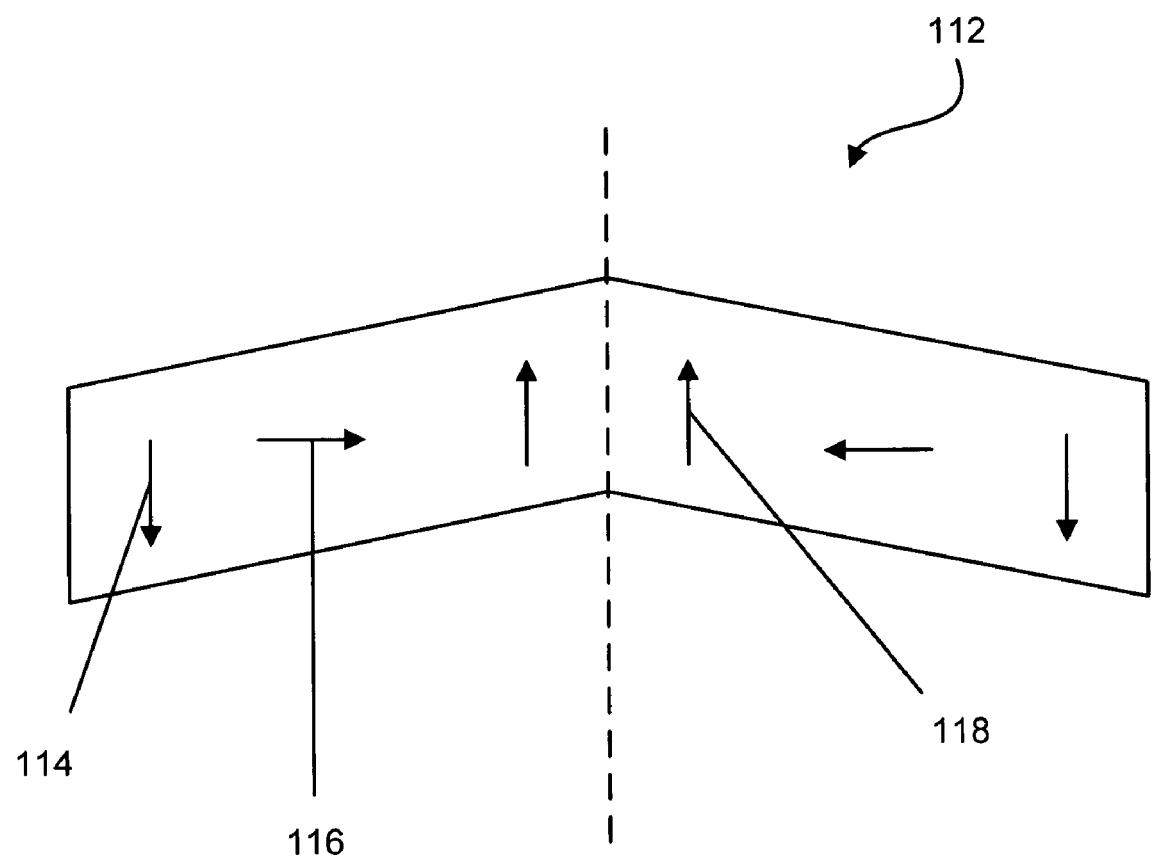
FIG. 12B is a cross-sectional side view of another exemplary high intensity radial field (HIRF) permanent magnet, in accordance with the second exemplary embodiment of the invention.

FIG. 12A is a partial cutaway schematic view of an exemplary high intensity radial field (HIRF) permanent magnet, in accordance with the second exemplary embodiment of the invention. FIG. 12B is a cross-sectional side view of another exemplary high intensity radial field (HIRF) permanent magnet, in accordance with the second exemplary embodiment of the invention. It should be noted that the magnet 112 of FIG. 12A and FIG. 12B are shown as solid members, while the magnetic actuator 110 shown in FIG. 10 requires annular magnets 112. The illustration of FIGS. 12A and 12B are merely for exemplary purposes and either magnet 112 could be made annular, if desired, without deviating from the scope of the invention. In some embodiments, such as that in FIG. 10, it is understood that the magnet(s) 112 is annular for allowing the rod 124 to reside therein and vertically shift within the magnets 112. The magnet 112 may be disk-shaped, as shown in FIG. 12A, or it may be radially canted, as shown in FIG. 12B. With either magnet 112 design shown in FIG. 12A and FIG. 12B, a conductive coil 120 should be positioned relative to an axis of the magnet 112 to construct the magnetic actuator 110. Also, with regards to the canted magnet 112 of FIG. 12B, the magnetic actuator 110 will operate whether the magnet 112 is canted toward or away from the conductive coil 120.

The magnet 112 may or may not be annular and may be magnetized in the orientations shown in FIG. 12A or in the opposite orientations, respectively. The outer magnet portion 114 has a magnetization pointing axially out of the bottom of the array; the magnetization of the middle magnet portion 116 is perpendicular to the magnetization of the outer magnet portion 114 and points in the inward radial direction; and the magnetization of the inner magnet portion 118 points anti-parallel to the outer magnet portion 114, i.e., out of the top of the array. Inner and outer magnet portions 114, 118 are anti-parallel to each other and may be magnetized in the opposite directions, and the middle magnet portion 116 may be magnetized in either radial direction, in both cases, depending on the side axially where the magnetic field is to be intensified.

In accordance with the second exemplary embodiment of the invention, the magnet 112 may be a single magnet having fields operating in multiple directions. The desired magnetization field distribution can be achieved via several known magnetization fixture types. Since the permanent magnet material must be driven past its saturation value of ~1T to 1.5T by a typical factor of 3-4, peak magnetic field values of 3T to 6T can be required. Three basic types of magnetizers that are available today are the electromagnet magnetizer, the half-cycle magnetizer and the capacitive discharge magnetizer. The electromagnet magnetizer can provide long pulses and is primarily useful for magnetizing Alnico and ferrites. The half-cycle magnetizer is based upon line excitation and requires a high-current fixed installation. The half-cycle magnetizer can provide one, two, or three half-cycle pulses of current and is primarily useful for ferrite magnets. The capacitive discharge magnetizer can provide very high currents useful for rare earth permanent magnets.

Figure 13:
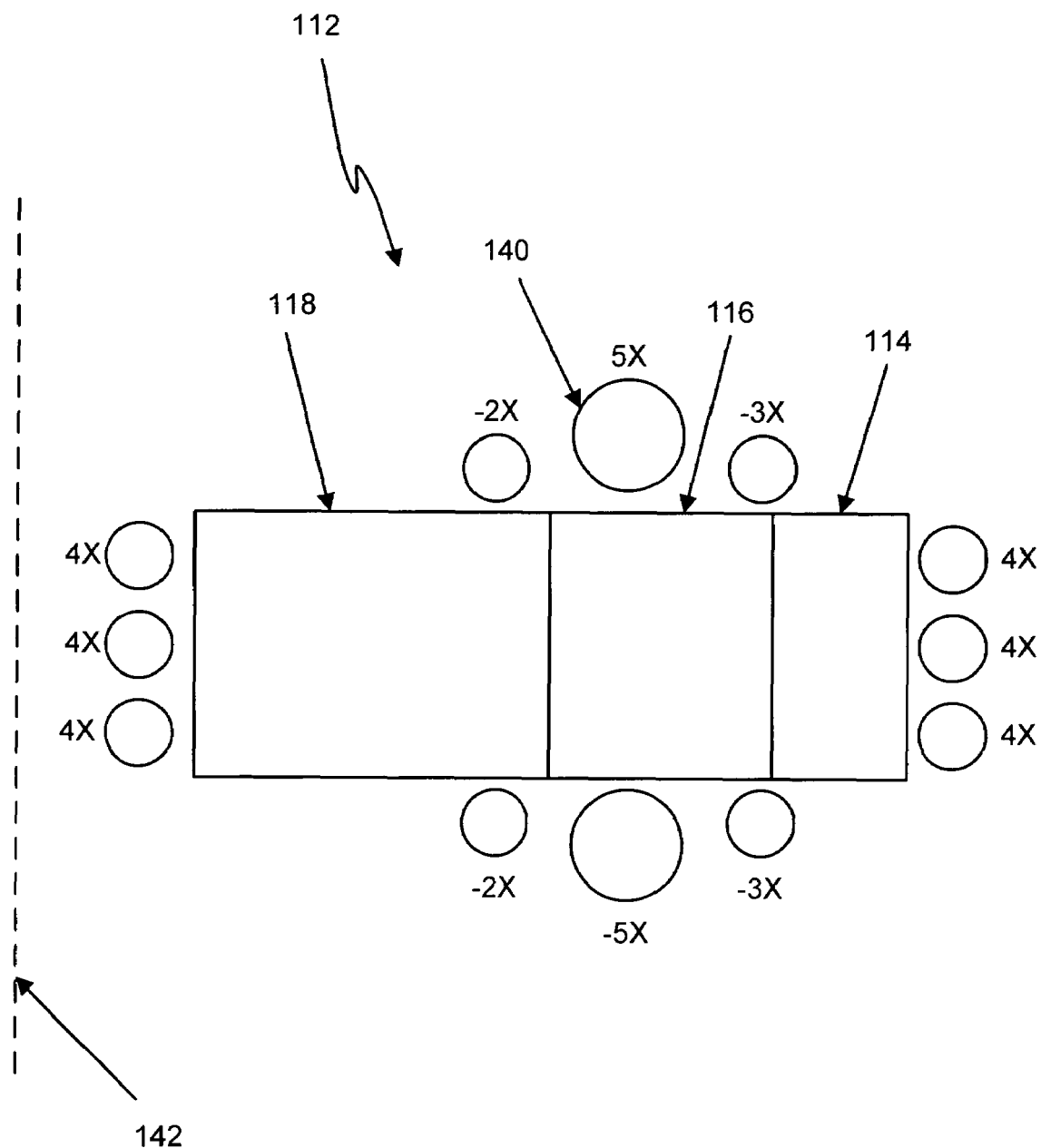
FIG. 13 is a cross-sectional view of a portion of a single magnet set to be magnetized by a set of conductors, in accordance with the second exemplary embodiment of the invention.

The desired magnetic field pattern is indicated by the magnetization of the three component magnet portions shown in FIG. 12A. To impress the desired magnetic field corresponding to the three component magnetic portions 114, 116, 118, on a single magnet 112 requires a unique conductor coil 140 arrangement. One such arrangement is shown in FIG. 13. FIG. 13 is a cross-sectional view of a portion of a single magnet 112 set to be magnetized by a set of conductors 140, in accordance with the second exemplary embodiment of the invention. For the geometry shown, respective of the magnet 112 and coil 140 axis 142, currents should be scaled according to the final field desired and the ratios indicated (wherein #x is provided next to each coil 140 and 5× is a five times multiplier, a positive multiplier is indicative of a current going into the page, and a negative multiplier is indicative of a current coming out of a page), depending upon the desired size of the final piece. For a piece 5 mm thick in the shape shown, the multiplier of the current ratios should be 8000, i.e., peak current-turns of ±40,000 Amp-turns would be needed. Other conductor coil 140 positions and ratios may be utilized within the scope of this invention as the relative shape of the magnet 112, or its respective fields, is changed. Magnetic finite element software packages are available to aid the designer in selecting the conductor coil 140 locations and current-turn values.

Figure 14:
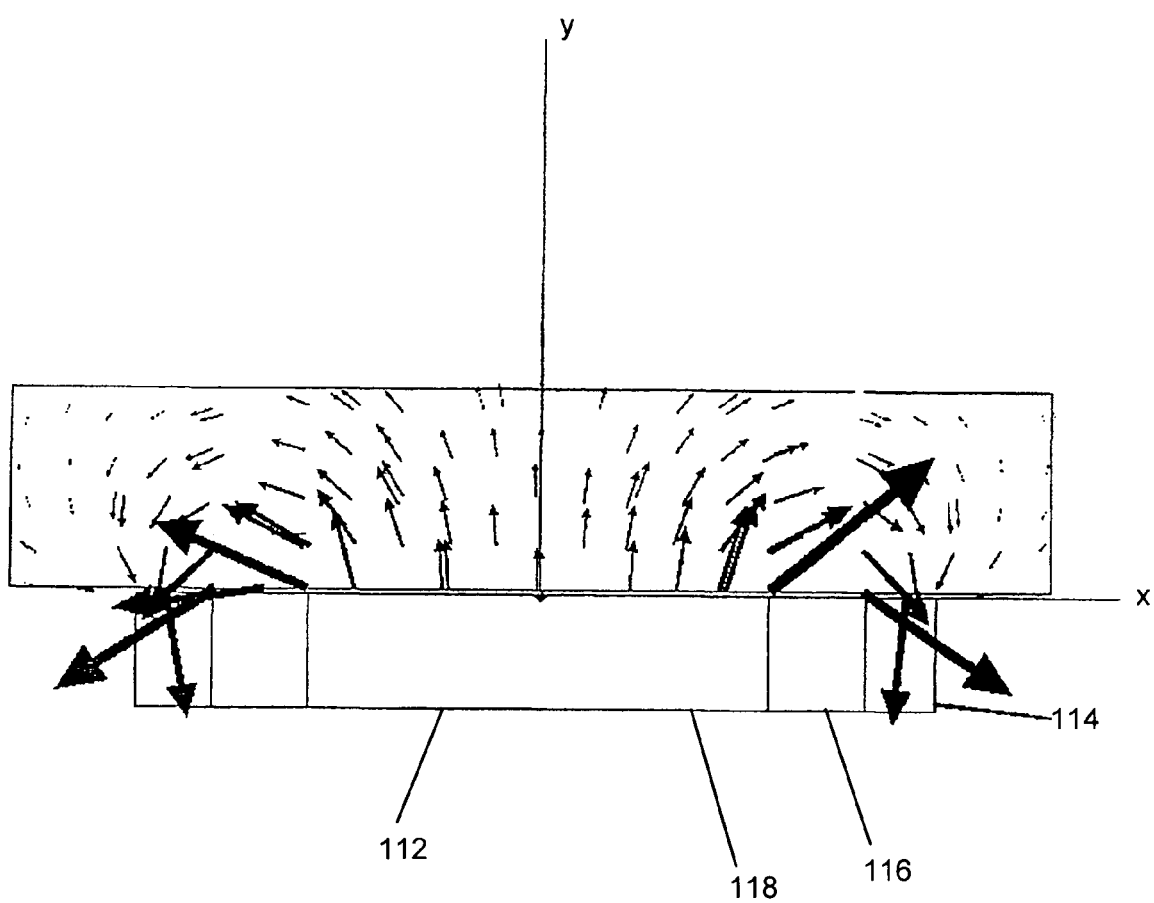
FIG. 14 is an arrow plot illustrating the radial magnetic field orientation above one magnet, in accordance with the second exemplary embodiment.

The results of magnetic finite element calculation are shown in FIG. 14. FIG. 14 illustrates an arrow plot of the magnetic field orientation above the magnet 112. It should be noted that the magnitude of magnetic fields is represented by differently sized arrows, where larger sized arrows represent larger magnitudes of magnetic fields. The magnetic flux lines are shown above the magnet 112, similar to the illustration of FIG. 8, with regards to the first exemplary embodiment. It should be noted, in comparing the embodiments, that similar magnetic field orientation can be created using a single magnet 112, multiple cylindrical magnets, or a plurality of magnets of various shapes. Those having ordinary skill in the art will recognize an abundance of ways to create similar magnetic field orientation using a plurality of magnets of various shapes and sizes. All prospective configurations of magnets that generate magnetic field orientation similar to the orientation disclosed, are considered to be within the scope of the invention.

Several useful magnetic materials, such as NdFeB, are found to be anisotropic in nature. Anistropic meaning the materials have different magnetic properties in different directions. To increase the stored magnetic field, and to accommodate this characteristic of the materials, the materials can be pre-aligned in the magnetizing jig according to the desired magnetization pattern before magnetization occurs. After the permanent magnet material has been magnetized in the manner indicated, the single piece magnets can be used individually, in pairs with an air gap, or can be stacked together, depending upon the application.

One of the differences between the first exemplary embodiment of the invention, shown in FIG. 1, and the second exemplary embodiment of the invention, shown in FIG. 10, is that the first exemplary embodiment teaches a nested magnetic array 12, while the second exemplary embodiment teaches single-piece magnets 112. Similarly, those having ordinary skill in the art will recognize other embodiments of the invention exist for nesting two magnets using a combination of the techniques taught in the two exemplary embodiments and those embodiments are considered to be within the scope of the present invention.

Figure 15:
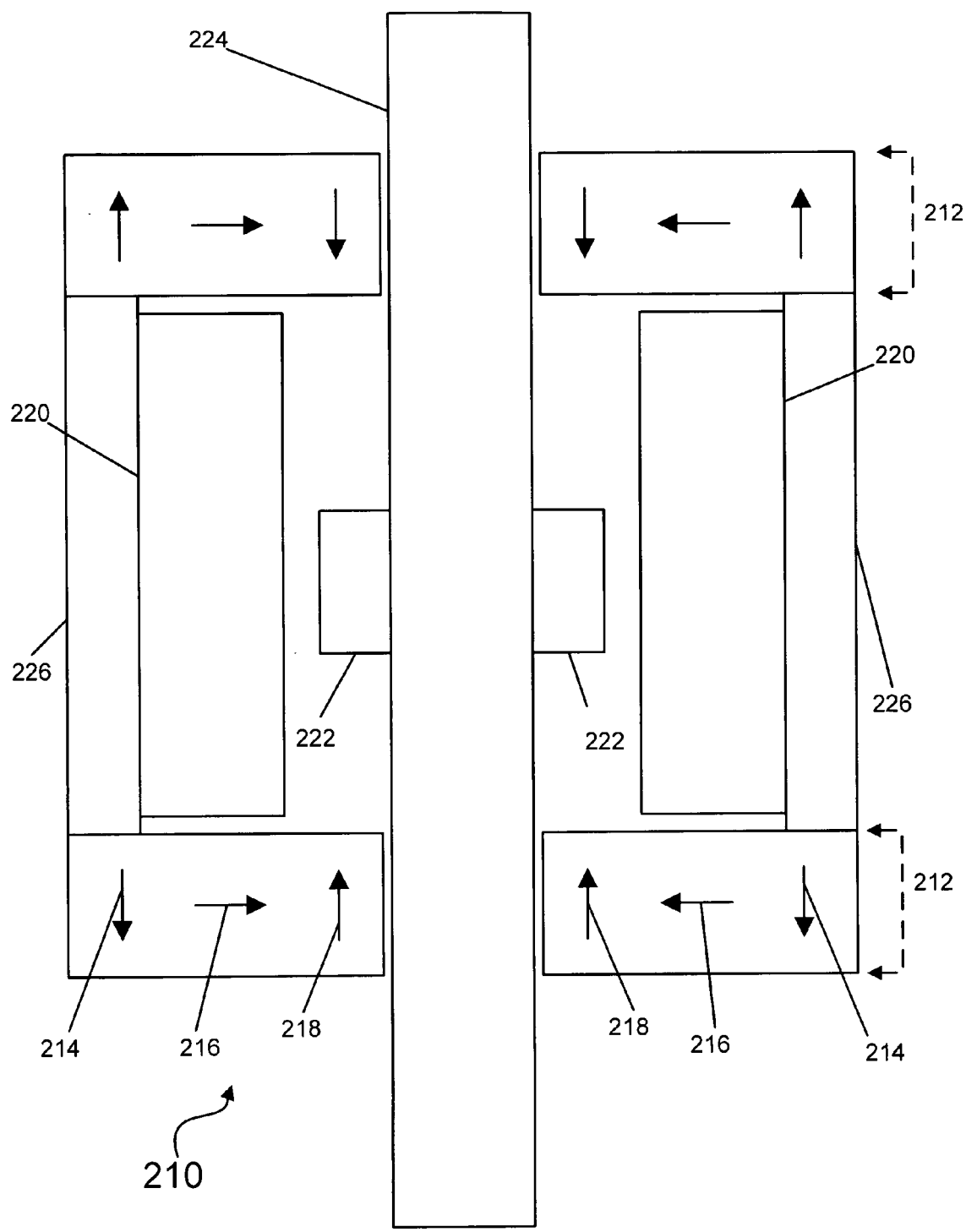
FIG. 15 is a cross-sectional view of a magnetic actuator, in accordance with a third exemplary embodiment of the invention.

FIG. 15 is a cross-sectional view of a third exemplary embodiment of the magnetic actuator 210. At least one set of two magnets 212 is provided, each magnet 212 having an outer magnet portion 214, a middle magnet portion 216, and an inner magnet portion 218. Arrows shown within the magnet portions 214, 216, 218, illustrate the magnetization of the three magnet portions 214, 216, 218. The outer magnet portion 214 has a magnetization pointing in an at least partially axial direction. The middle magnet portion 216 has a magnetization substantially perpendicular to the magnetization of the outer magnet portion 214. The inner magnet portion 218 has a magnetization directed substantially anti-parallel to the magnetization of the outer magnet portion 214. Comparing the magnetization of the magnet portions 214, 216, 218 in the two magnets 212, the magnetizations of the two outer magnet portions 214 are anti-parallel, the magnetizations of the two middle magnet portions 216 are parallel, and the magnetizations of the two inner magnet portions 218 are anti-parallel. The magnetic actuator 210 also includes at least one electrically conductive coil 220 positioned at least partially between the two magnets 212. At least one substantially magnetically permeable object 222 is positioned at least partially between the two magnets 212 and, in this third exemplary embodiment, at least partially, radially within at least one of the electrically conductive coils 220. A rod 224 is integral with the substantially magnetically permeable object 222 and extends axially within each of the two magnets 212 and the electrically conductive coil 220. Specifically, the magnets 212 provide an opening within which the rod 224 is located. Therefore, the rod 224 is capable of vertically shifting through the magnets 212.

A magnetically permeable back iron 226 is connected to and extending between each of the outer magnet portions 214 in the set of magnets 212. The magnetically permeable back iron 226 is used to focus the paths of the magnetic fields and may be used for this purpose with any of the embodiments of the invention described herein. In other embodiments the magnetically permeable back iron 226 may be more usefully located between other portions of the magnets 212.

A current may be distributed over the conductive coil 220, wherein a magnetic field of at least one of the magnets 212 may be substantially perpendicular to the current in the conductive coil 220. The rod 224 may be substantially magnetically impermeable. The magnetic actuator 210 will function if the rod 224 is magnetically permeable, however the rod 224 may then interfere with the magnetization and, as a result, cause the magnetic actuator 210 to operate less efficiently.

Figure 16:
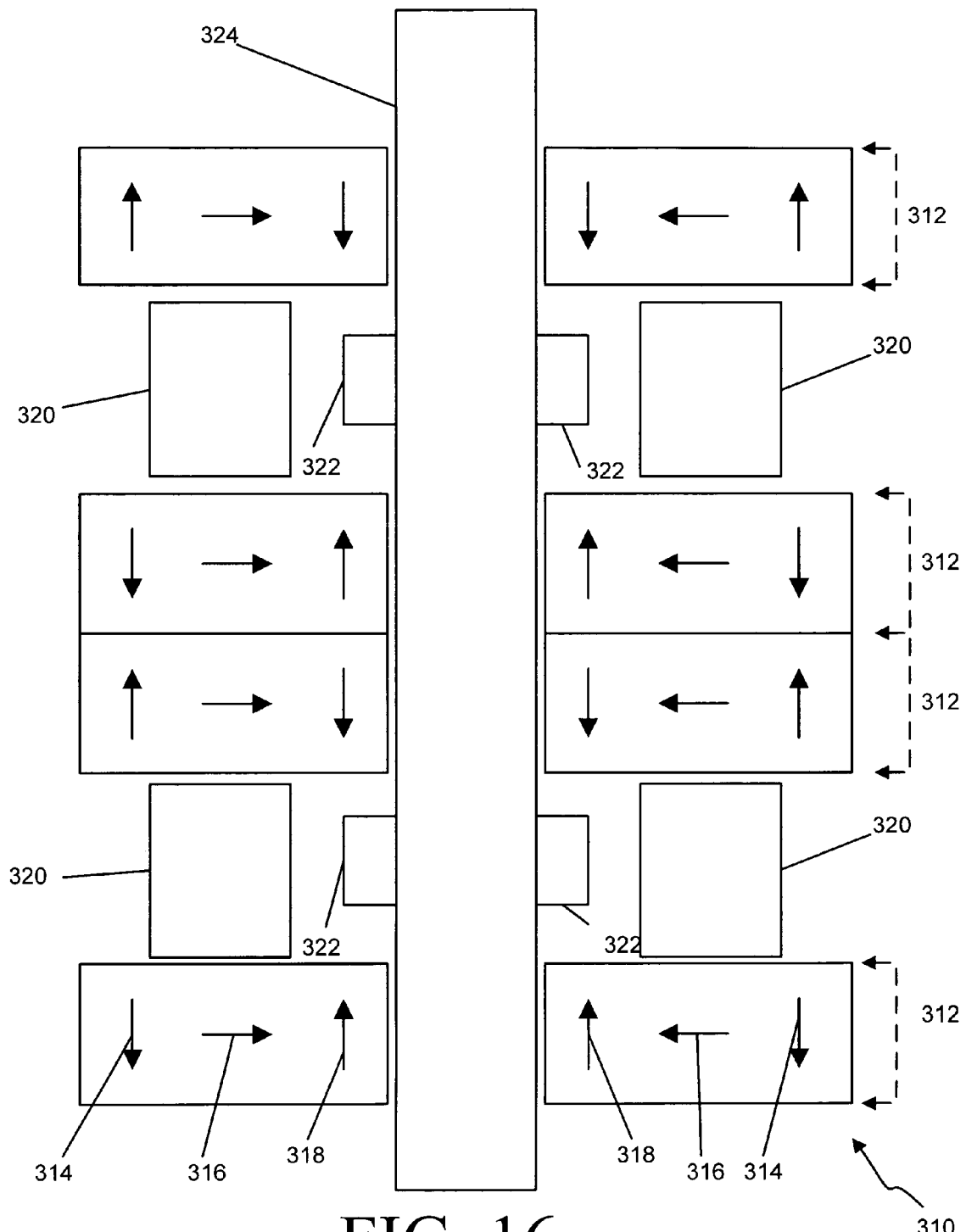
FIG. 16 is a cross-sectional view of a magnetic actuator, in accordance with a fourth exemplary embodiment of the invention.

FIG. 16 is a cross-sectional view of a fourth exemplary embodiment of the magnetic actuator 310. The magnetic actuator 310 includes two sets of two magnets 312. Each magnet 312 having an outer magnet portion 314, a middle magnet portion 316, and an inner magnet portion 318. Arrows shown within the magnet portions 314, 316, 318 illustrate the magnetization of the three magnet portions 314, 316, 318. The outer magnet portion 314 has a magnetization pointing in an at least partially axial direction. The middle magnet portion 316 has a magnetization substantially perpendicular to the magnetization of the outer magnet portion 314. The inner magnet portion 318 has a magnetization directed substantially anti-parallel to the magnetization of the outer magnet portion 314. Comparing the magnetization of the magnet portions 314, 316, 318 in the two magnets 312 of each set, the magnetizations of the two outer magnet portions 314 are anti-parallel, the magnetizations of the two middle magnet portions 316 are parallel, and the magnetizations of the two inner magnet portions 318 are anti-parallel. The two sets of two magnets 312 are axially aligned and abut each other. Comparing the magnetization of the magnet portions 314, 316, 318 in the abutting magnets 312 of each set, the magnetizations of the two outer magnet portions 314 are anti-parallel, the magnetizations of the two middle magnet portions 316 are parallel, and the magnetizations of the two inner magnet portions 318 are anti-parallel. The magnetic actuator 310 also includes two electrically conductive coils 320. One electrically conductive coil 320 is positioned at least partially within each of the two sets of magnets 312. One substantially magnetically permeable object 322 is positioned at least partially between each of the two sets of two magnets 312. A rod 324 is integral with the substantially magnetically permeable object 322 and extends axially within each of the sets of two magnets 312 and the electrically conductive coils 320. Specifically, the magnets 312 provide an opening within which the rod 324 is located. Therefore, the rod 324 is capable of vertically shifting through the magnets 312.

Abutting two sets of magnets 312, as shown in FIG. 16, may be useful for increasing the force applied to the rod 324, if both substantially magnetically permeable objects 322 are attached to one rod 324, without increasing the intensity of the individual magnets 312. Alternatively, the arrangement of abutting magnets 312 may be used to affect two different rods 324 in the same area, although affecting two rods 324 would necessitate locating at least one of the substantially magnetically permeable objects 322 along a periphery of the space between the set of two magnets 312, an arrangement which is discussed further herein. The individual abutting magnets 312 shown in FIG. 16 have anti-parallel magnetic forces applied at the inner magnet portion 318 and the outer magnet portion 314, substantially canceling the magnetic force from those magnet portions 314, 318 and leaving only the combined radial magnetic force from the middle magnet portion 316. Alternatively, a single magnet having only a radial magnetic force can be used to replace the individual abutting magnets 312.

Figure 17:
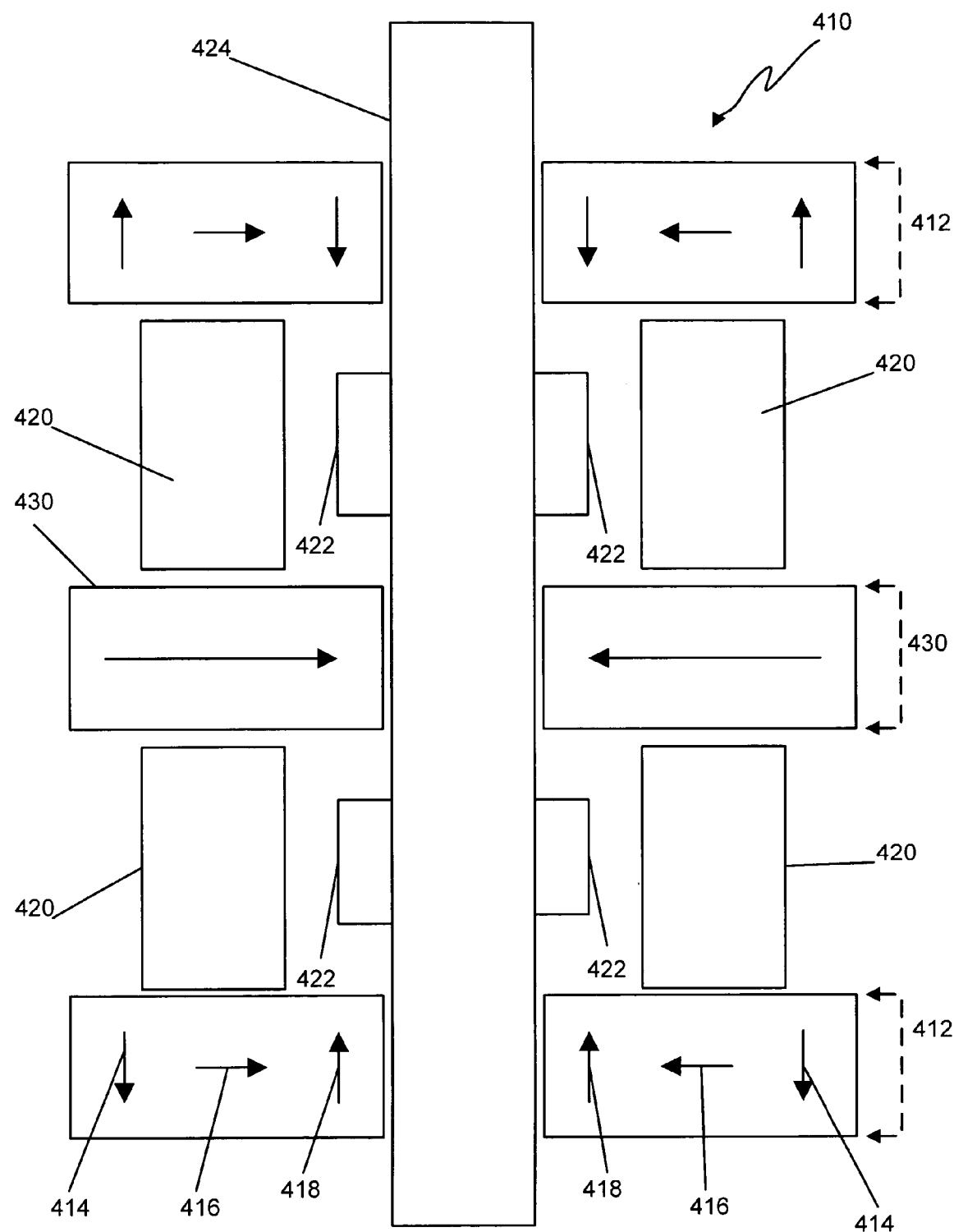
FIG. 17 is a cross-sectional view of a magnetic actuator, in accordance with a fifth exemplary embodiment of the invention.

FIG. 17 is a cross-sectional view of a fifth exemplary embodiment of the magnetic actuator 410. One set of two nested magnets 412 is provided, each magnet 412 having an outer magnet portion 414, a middle magnet portion 416, and an inner magnet portion 418. Arrows shown within the magnets 414, 416, 418, illustrate the magnetization of the three magnets 414, 416, 418. The outer magnet portion 414 has a magnetization pointing in an at least partially axial direction. The middle magnet portion 416 has a magnetization substantially perpendicular to the magnetization of the outer magnet portion 414. The inner magnet portion 418 has a magnetization directed substantially anti-parallel to the magnetization of the outer magnet portion 414. Comparing the magnetization of the magnets 414, 416, 418 in the two nested magnets 412, the magnetizations of the two outer magnet portions 414 are anti-parallel, the magnetizations of the two middle magnet portions 416 are parallel, and the magnetizations of the two inner magnet portions 418 are anti-parallel. A third magnet 430 is mounted between the two nested magnets 412. The third magnet 430 has a singular magnetization that is substantially parallel to the magnetization of the middle magnet portions 416. The magnetic actuator 410 also includes two electrically conductive coils 420, one electrically conductive coil 420 positioned at least partially between the third magnet 430 and each of the two nested magnets 412. Two substantially magnetically permeable objects 422 are provided, one of the substantially magnetically permeable objects 422 is positioned at least partially between the third magnet 430 and each of the two nested magnets 412. A rod 424 is integral with the substantially magnetically permeable object 422 and extends axially within each of the two nested magnets 412, the third magnet 430 and the electrically conductive coil 420. Specifically, the magnets 412 provide an opening within which the rod 424 is located. Therefore, the rod 424 is capable of vertically shifting through the magnets 412.

FIG. 16 and FIG. 17 are essentially equivalent. The third magnet 430 in FIG. 17 has the same effect in magnetic actuator 410 that the two abutting magnets 312 have at the center of the magnetic actuator 310 of FIG. 16. The sum forces resulting from the two abutting magnets 312 at the center of the magnetic actuator 310 of FIG. 16 are equivalent to the force resulting from the third magnet 430 of the magnetic actuator 410 of FIG. 17.

Figure 18:
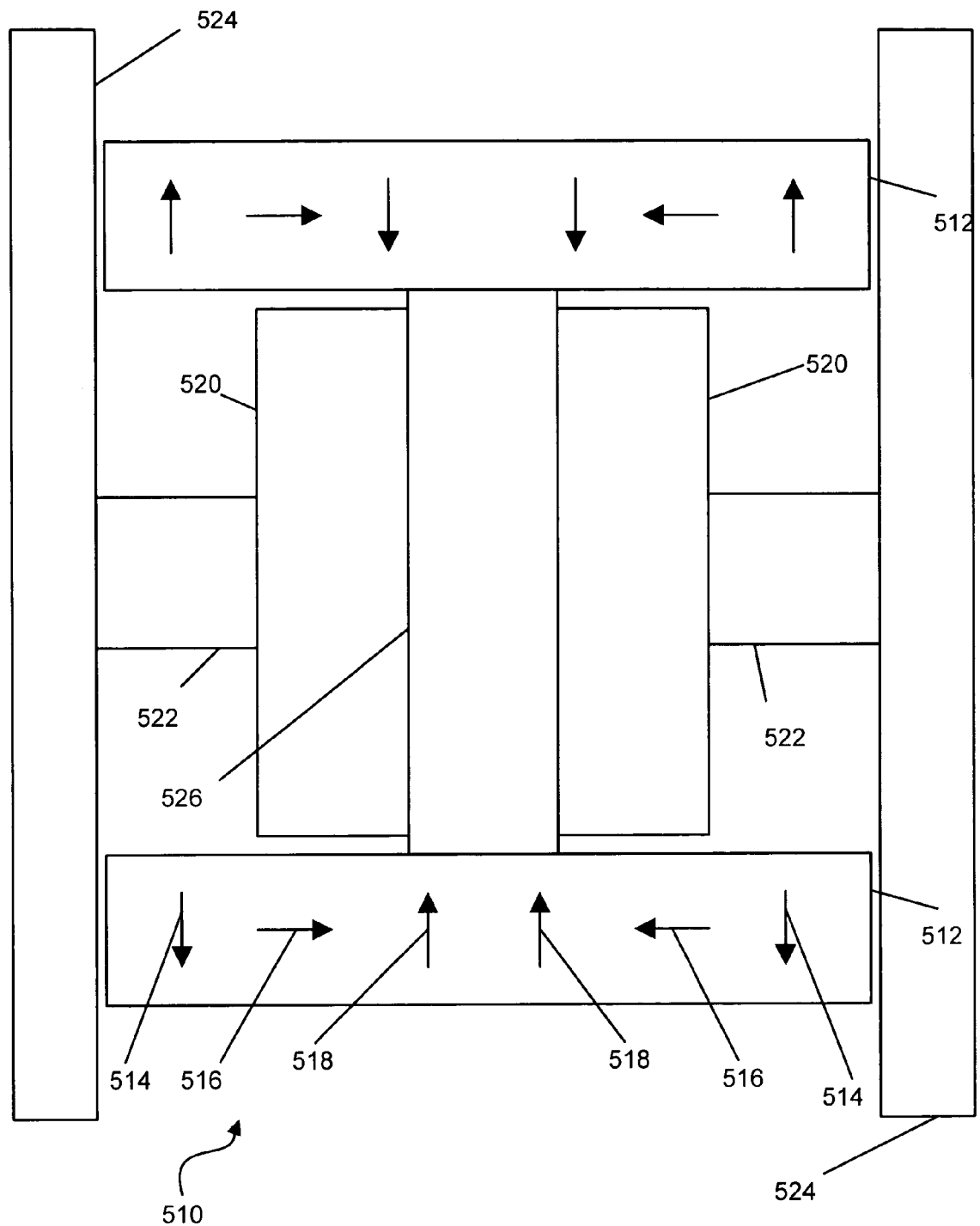
FIG. 18 is a cross-sectional view of a magnetic actuator, in accordance with a sixth exemplary embodiment of the invention.

FIG. 18 is a cross-sectional view of a sixth exemplary embodiment of the magnetic actuator 510. At least one set of two magnets 512 is provided, each nested magnetic array 412 having an outer magnet portion 514, a middle magnet portion 516, and an inner magnet portion 518. Arrows shown within the magnet portions 514, 516, 518 illustrate the magnetization of the three magnet portions 514, 516, 518. The outer magnet portion 514 has a magnetization pointing in an at least partially axial direction. The middle magnet portion 516 has a magnetization substantially perpendicular to the magnetization of the outer magnet portion 514. The inner magnet portion 518 has a magnetization directed substantially anti-parallel to the magnetization of the outer magnet portion 514. Comparing the magnetization of the magnet portions 514, 516, 518 in the two magnets 512, the magnetizations of the two outer magnet portions 514 are anti-parallel, the magnetizations of the two middle magnet portions 516 are parallel, and the magnetizations of the two inner magnet portions 518 are anti-parallel. The magnetic actuator 510 also includes at least one electrically conductive coil 520 positioned at least partially between the two magnets 512. At least one substantially magnetically permeable object 522 is positioned at least partially between the two magnets 512 and radially exterior to the electrically conductive coil 520. A rod 524 is integral with the substantially magnetically permeable object 522 and extends axially along the two magnets 512. A magnetically permeable back iron 526 is positioned between the inner magnet portions 518 of the magnets 512.

The sixth exemplary embodiment of the magnetic actuator 510, as shown in FIG. 18, permits the rod 524 to be placed exterior to the magnets 512 rather than piercing the magnets 512. Those having ordinary skill in the art will recognize that this embodiment may be combined with various other embodiments for different effects. Two abutting sets of magnets 512 may be provided, one set having the rod 524 exterior to the magnets 512 and one set having the rod 524 piercing the magnets 512. The rod 524 may be a hollow cylinder encapsulating the magnets 512 or the rod 524 may simply be attached on only one side of the magnets 512.

Figure 19:
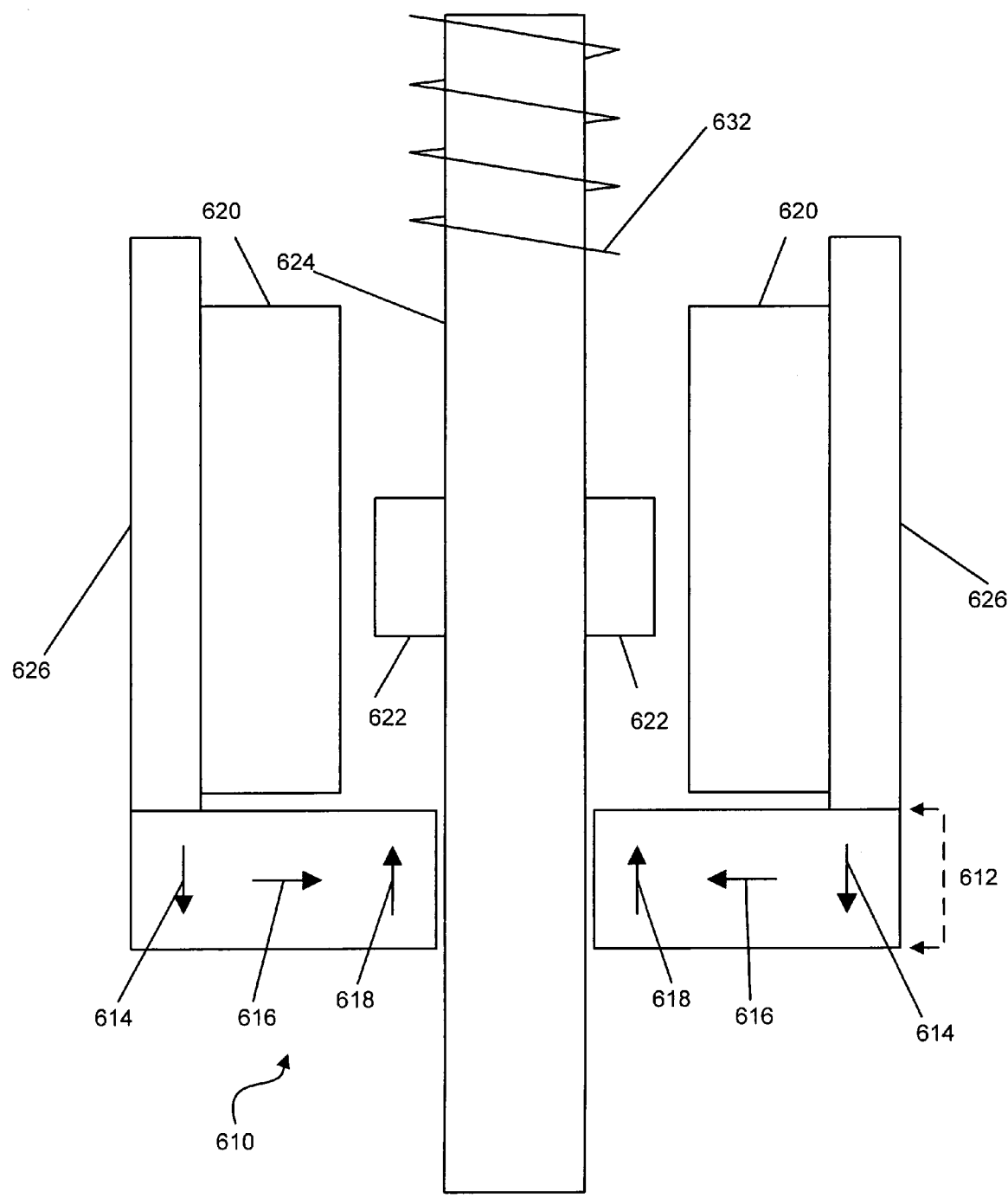
FIG. 19 is a cross-sectional view of a magnetic actuator, in accordance with a seventh exemplary embodiment of the invention.

FIG. 19 is a cross-sectional view of a seventh exemplary embodiment of a magnetic actuator 610. The magnetic actuator 610 includes a magnet 612 with a magnetic force, the magnetic force having at least a vertical component and a radial component. An electrically conductive coil 620 is axially aligned with and positioned proximate to the magnet 612 for enhancing and/or altering the magnetic force. A substantially magnetically permeable object 622 having a range of movement is positioned sufficiently proximate to the magnet 612 to be moved by the magnetic force as enhanced or altered by the electrically conductive coil 620. A counterbalance 632 is positioned proximate to the substantially magnetically permeable object 622 to limit the range of movement of the substantially magnetically permeable object 622 whereby the substantially magnetically permeable object 622 remains proximate to the magnet 612. A magnetically permeable back iron 626 is connected to and extending from the outer magnet portion 614 of the magnet 612.

The counterbalance 632 may be a spring, a magnet, an elastic object, a rigid object, gravity, or any other element or force capable of restraining the substantially magnetically permeable object 622, particularly while the magnetic force, or lack thereof, is urging the substantially magnetically permeable object 622 away from the magnet 612. The counterbalance 632 keeps the substantially magnetically permeable object 622 proximate to the magnet 612 and/or is capable of urging the substantially magnetically permeable object 622 into a position proximate to the magnet 612. The magnet 612 in the seventh exemplary embodiment may be formed identically to the described magnet 112 of the second exemplary embodiment or it may be designed otherwise.

While the exemplary embodiments disclosed herein primarily address the use of one or more magnets with a coil and an actuating rod, other applications exist for using the magnet disclosed herein as an actuator. For instance, an actuator can be produced using a single magnet and a coil printed on a flexible membrane and the coil is at least partially axially aligned with the magnet (where the magnetic fields are substantially radial and perpendicular to the coil). Force is exerted between the magnet and coil, when current traverses the coil, which tends to flex the flexible membrane. The flexing of the flexible membrane due to current flowing through the coil may produce sound like a speaker, distort a mirrored surface, stir/agitate a fluid, vibrate a means for polishing a surface. Conversely, external displacement of the membrane or coil can produce a voltage, which can be observed and recorded like a microphone. By known printing and etching processes, a telescoping coil (motion out of the initial plane of the coil) can be manufactured which extends in either direction depending upon the polarity of current passed through the coil in the presence of the magnet.

Figure 20:
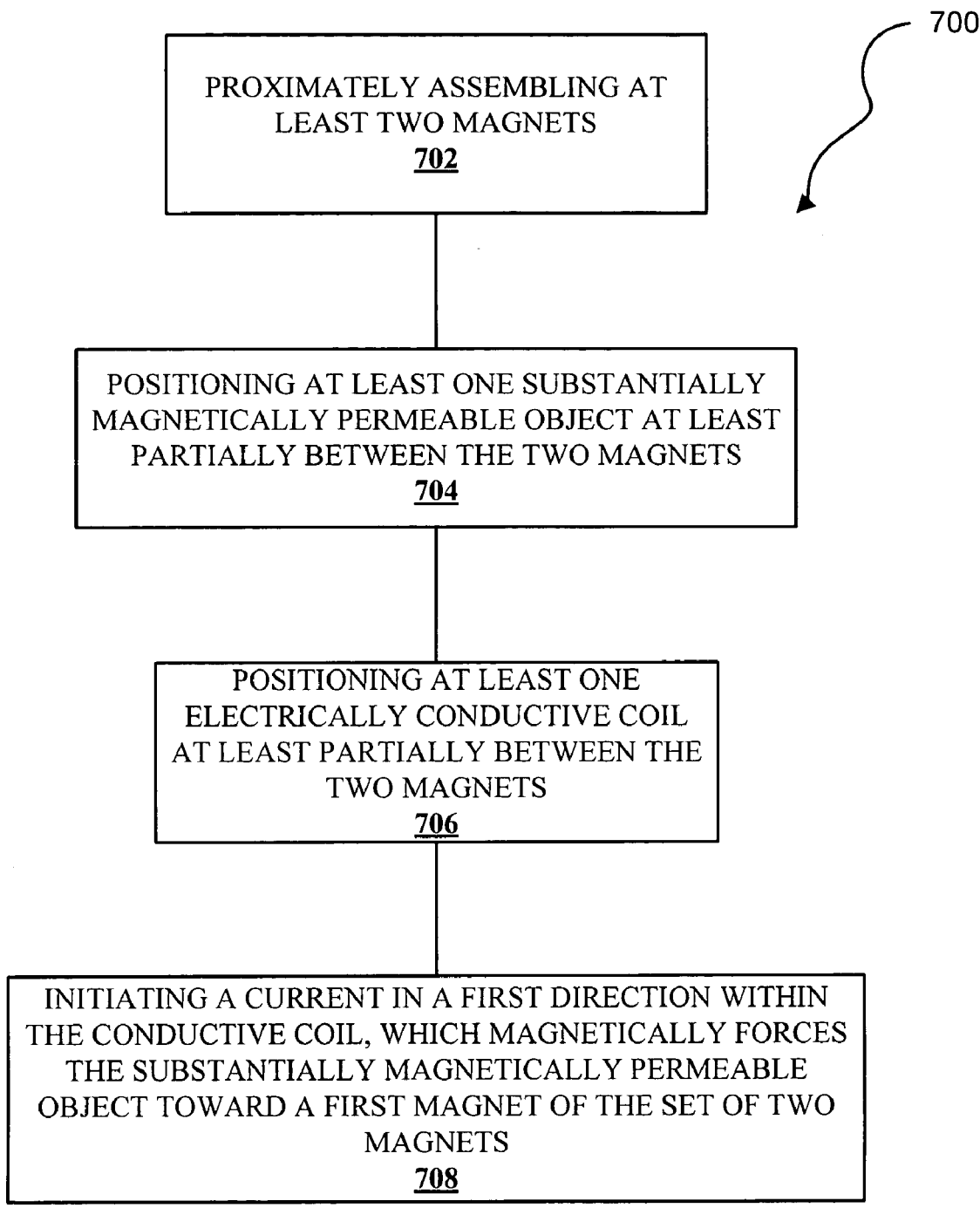
FIG. 20 shows a flow chart illustrating the functionality and operation of a possible implementation of the magnetic actuator of FIG. 10, in accordance with a second exemplary embodiment of the invention.

The flow chart of FIG. 20 shows the functionality and operation of a possible implementation of the magnetic actuator 110 of FIG. 10, in accordance with a second exemplary embodiment of the invention. In this regard, each block represents a module, segment, or step, which comprises one or more instructions for implementing the specified function. It should also be noted that in some alternative implementations, the functions noted in the blocks might occur out of the order noted in FIG. 20. For example, two blocks shown in succession in FIG. 20 may in fact be executed substantially concurrently or the blocks may sometimes be executed in the reverse order, depending upon the functionality involved, as will be further clarified herein.

As shown in FIG. 20, a method 700 for moving an actuator includes proximately assembling at least two magnets 112 (block 702). Each magnet 112 includes an outer magnet portion 114 having a magnetization pointing in an at least partially axial direction. Each magnet 112 includes a middle magnet portion 116 having a magnetization substantially perpendicular to the magnetization of the outer magnet portion 114. Each magnet 112 also includes an inner magnet portion 118 having a magnetization directed substantially anti-parallel to the magnetization of the outer magnet portion 114. At least one substantially magnetically permeable object 122 positioned at least partially between the two magnets 112 (block 704). At least one electrically conductive coil 120 positioned at least partially between the two magnets 112 (block 706). A current initiated in a first direction within the conductive coil 120, which magnetically forces the substantially magnetically permeable object 122 toward a first magnet 112 of the set of two magnets 112 (block 708).

Figure 21:
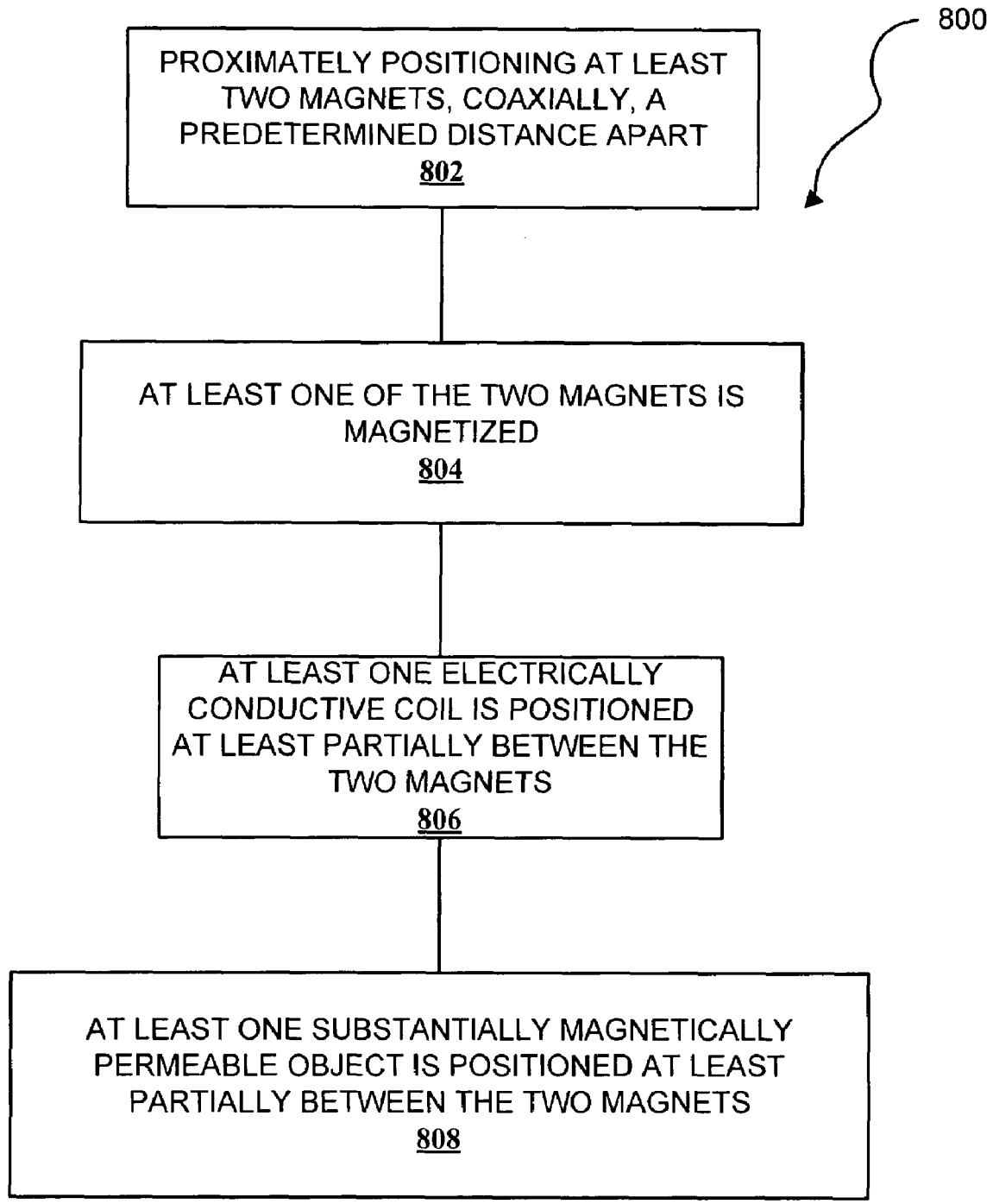
FIG. 21 shows a flow chart illustrating the functionality and operation of a possible assembly of the magnetic actuator of FIG. 10, in accordance with a second exemplary embodiment of the invention.

The flow chart of FIG. 21 shows the functionality and operation of a possible assembly of the magnetic actuator 110 of FIG. 10, in accordance with a second exemplary embodiment of the invention. As shown in FIG. 21, a method 800 for assembling a magnetic actuator may include proximately positioning at least two magnets 112, coaxially, a predetermined distance apart (block 802). At least one of the two magnets 112 is magnetized (block 804), such that the magnetized magnet 112 includes an outer magnet portion 114 having a magnetization pointing in an at least partially axial direction; a middle magnet portion 116 having a magnetization substantially perpendicular to the magnetization of the outer magnet portion 114; and an inner magnet portion 118 having a magnetization directed substantially anti-parallel to the magnetization of the outer magnet portion 114. At least one electrically conductive coil 120 is positioned at least partially between the two magnets 112 (block 806). At least one substantially magnetically permeable object 122 is positioned at least partially between the two magnets 112 (block 808), an actuating rod 124 integral with the substantially magnetically permeable object 122 and extending therefrom.

Magnetizing the at least one magnet 112 of the set of magnets 112 (block 804) may include arranging a plurality of conductor coils 140 proximate to the magnet 112, wherein the magnet 112 material is in a pre-aligned state. A plurality of currents is then initiated through the conductor coils 140, thereby magnetizing the magnet 112 material.

It should be emphasized that the above-described embodiments of the present invention, are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. An apparatus, comprising:
   a set of at least two magnets;
   at least one of the two magnets comprising:
   an outer magnet portion having a magnetization pointing in an at least partially axial direction;

a middle magnet portion having a magnetization substantially perpendicular to the magnetization of the outer magnet portion; and
an inner magnet portion having a magnetization directed substantially anti-parallel to the magnetization of the outer magnet portion;
at least one electrically conductive coil positioned at least partially between the two magnets;
at least one substantially magnetically permeable object positioned at least partially between the two magnets; and
an actuating rod integral with the substantially magnetically permeable object and extending therefrom.

2. The apparatus of claim 1 further comprising a back iron connected to and extending between each of the magnets.

3. The apparatus of claim 1 further comprising a current distributed over the conductive coil, wherein a magnetic field of at least one of the magnets is substantially perpendicular to the current in the conductive coil.

4. The apparatus of claim 1 wherein the rod is substantially magnetically impermeable.

5. The apparatus of claim 1 further comprising at least one copper sheet attached to one of the magnets, the copper sheet located between one of the magnets and one of the conductive coils.

6. The apparatus of claim 1 comprising:
two sets of two magnets wherein each individual set of two magnets comprises:
one electrically conductive coil positioned at least partially within the individual set of two magnets; and
one substantially magnetically permeable object positioned at least partially between the individual set of two magnets and at least partially, radially within the one electrically conductive coil; and
wherein the rod is integral with each of the substantially magnetically permeable objects and extends axially within each of the sets of two magnets and each of the electrically conductive coils.

7. The apparatus of claim 1 further comprising:
a third magnet having a magnetization substantially parallel to the magnetization of the middle magnet portion, the third magnet positioned axially between the set of two magnets;
wherein the at least one electrically conductive coil further comprises two electrically conductive coils, one electrically conductive coil positioned at least partially between each of the magnets in the set of two magnets and the third magnet;
wherein the at least one substantially magnetically permeable object further comprises two substantially magnetically permeable objects, one substantially magnetically permeable object positioned at least partially between each of the magnets in the set of two magnets and the third magnet.

8. The apparatus of claim 1 wherein the rod extends axially within each of the sets of two magnets and each of the electrically conductive coils.

9. A method for actuating, said method comprising the steps of:
proximately assembling at least one set of two magnets, the magnets comprising:
an outer magnet portion having a magnetization pointing in an at least partially axial direction;
a middle magnet portion having a magnetization substantially perpendicular to the magnetization of the outer magnet portion; and
an inner magnet portion having a magnetization directed substantially anti-parallel to the magnetization of the outer magnet portion;
positioning at least one substantially magnetically permeable object at least partially between the set of two magnets;
positioning at least one electrically conductive coil at least partially between the set of two magnets; and
initiating a current in a first direction within the conductive coil, which magnetically forces the substantially magnetically permeable object toward a first magnet of the set of two magnets.

10. The method of claim 9 further comprising redirecting the current in a direction opposite the first direction, forcing the substantially magnetically permeable object toward a second magnet of the set of two magnets.

11. The method of claim 9 further comprising dissipating heat proximate to the conductive coil with a thermally conductive sheet attached to one of the magnets.

12. The method of claim 9 further comprising focusing the magnetization of the magnets by inserting a back iron, connecting the magnets.

13. A system for magnetically moving an actuator, the system comprising:
means for providing a first magnetic field, the first magnetic field having at least a first vertical direction and a first radial direction;
means for providing a second magnetic field proximate to the means for providing a first magnetic field, the second magnetic field having a second vertical direction opposing the first vertical direction and a second radial direction cooperative with the first radial direction;
means for actuating approximately statically balanced by the first magnetic field and the second magnetic field; and
means for electrically adding a third magnetic field that, once added, unbalances the means for actuating and causes the means for actuating to move.

14. An actuator, comprising:
a first magnet with a first magnetic field, the first magnetic field having at least a first axial direction and a first radial direction;
a second magnet with a second magnetic field, the second magnet proximate to the first magnet and the second magnetic field having a second axial direction and a second radial direction wherein the first axial direction and the second axial direction are symmetrically opposed and the first radial direction and the second radial direction are cooperative;
an electrically conductive coil positioned at least partially between the first and second magnets; and
a substantially magnetically permeable object positioned between the first and second magnets.

15. The actuator of claim 14 further comprising an actuating rod attached to the substantially magnetically permeable object wherein the actuating rod is substantially magnetically impermeable.

16. An actuation device comprising:
a first magnet, wherein the first magnet is annular, the first magnet comprising:
an outer magnet portion having a magnetization pointing in an at least partially axial direction;
a middle magnet portion having a radial magnetization substantially perpendicular to the magnetization of the outer magnet portion; and an inner magnet portion having a magnetization directed substantially anti-parallel to the magnetization of the outer magnet portion.

17. The actuation device of claim 16, further comprising: a second magnet comprising:
an outer magnet portion of the second magnet having a magnetization pointing in an at least partially axial direction;
a middle magnet portion of the second magnet having a radial magnetization substantially perpendicular to the magnetization of the outer magnet portion;
an inner magnet portion of the second magnet having a magnetization directed substantially anti-parallel to the magnetization of the outer magnet portion; and
a conductive coil, disposed between the first magnet and the second magnet, having a current distributed over a volume of the conductive coil, wherein a first magnetic field of the first magnet is substantially perpendicular to the current in the conductive coil and a second magnetic field of the second magnet is substantially perpendicular to the current in the conductive coil.

18. The actuation device of claim 16, further comprising a conductive coil having a current distributed over a volume of the conductive coil, wherein a magnetic field of the first magnet is substantially perpendicular to the current in the coil.

19. The actuation device of claim 18 further comprising a back iron connected to and extending from the first magnet.

20. The actuation device of claim 16 wherein the first magnet is canted.

21. The actuation device of claim 16, further comprising:
an electrically conductive coil axially aligned with and positioned proximate to the first magnet;
a substantially magnetically permeable object having a range of movement positioned sufficiently proximate to the first magnet to be moveable through the magnetic force; and
a counterbalance positioned to limit the range of movement of the substantially magnetically permeable object whereby the substantially magnetically permeable object remains proximate to the magnet.

22. The actuator of claim 21 wherein the counterbalance is a second magnet.

23. The actuator of claim 21 further comprising a rod integral with the substantially magnetically permeable object and wherein the counterbalance is a spring.

24. The actuator of claim 16 further comprising, a coil printed on a flexible membrane, the coil at least partially axially aligned with the magnet, whereby the flexible membrane will be moved in an axial direction, relative to the magnet, when a current traverses the coil.

25. An actuator, comprising:
a first magnet with a first magnetic field, the first magnetic field having a first radial direction;
a second magnet with a second magnetic field, the second magnet proximate to the first magnet and the second magnetic field having a second radial direction wherein the first radial direction and the second radial direction are parallel;
an electrically conductive coil positioned at least partially between the first and second magnets; and
a substantially magnetically permeable object positioned between the first and second magnets.

26. A method of making a magnetic actuator, the method comprising the steps of:
positioning at least two magnets, coaxially, a predetermined distance apart;
magnetizing at least one of the two magnets, such that the at least one of the two magnets comprises:
an outer magnet portion having a magnetization pointing in an at least partially axial direction;
a middle magnet portion having a magnetization substantially perpendicular to the magnetization of the outer magnet portion; and
an inner magnet portion having a magnetization directed substantially anti-parallel to the magnetization of the outer magnet portion;
positioning at least one electrically conductive coil at least partially between the two magnets; and
positioning at least one substantially magnetically permeable object at least partially between the two magnets, an actuating rod integral with the substantially magnetically permeable object and extending therefrom.

27. The method of claim 26, wherein the step of magnetizing at least one of the two magnets further comprises:
arranging a plurality of conductor coils proximate to the magnet, wherein a material of the magnet is in a pre-aligned state; and
initiating a plurality of currents through the conductor coils, thereby magnetizing the material of the magnet.

* * * * *